United States Patent
Lee et al.

(10) Patent No.: US 8,942,630 B2
(45) Date of Patent: Jan. 27, 2015

(54) TERMINAL AND METHOD OF IMPROVING INTERFERENCE IN A TERMINAL

(75) Inventors: Seung Sun Lee, Seoul (KR); Bum Suk Lee, Anyang-si (KR)

(73) Assignee: LG Electronics Inc., Seoul (KR)

(*) Notice: Subject to any disclaimer, the term of this patent is extended or adjusted under 35 U.S.C. 154(b) by 1335 days.

(21) Appl. No.: 12/359,020

(22) Filed: Jan. 23, 2009

(65) Prior Publication Data
US 2009/0247218 A1  Oct. 1, 2009

(30) Foreign Application Priority Data
Mar. 31, 2008 (KR) .................. 10-2008-0029923

(51) Int. Cl.
| | |
|---|---|
| H04B 7/00 | (2006.01) |
| H04W 16/14 | (2009.01) |
| H04W 88/06 | (2009.01) |
| H04B 1/10 | (2006.01) |
| H04W 72/12 | (2009.01) |

(52) U.S. Cl.
CPC .............. *H04W 16/14* (2013.01); *H04W 88/06* (2013.01); *H04B 1/10* (2013.01); *H04W 72/1215* (2013.01)
USPC ..................... 455/41.2; 455/562.1; 455/553.1; 455/129; 455/277.1; 370/329; 370/336; 370/338; 370/328

(58) Field of Classification Search
CPC ....... H04B 1/0475; H04B 1/40; H04W 16/14; H04W 88/06
USPC ............ 455/78, 331, 41.2, 552.1, 553.1, 129, 455/277.1; 370/329, 336, 338, 328
See application file for complete search history.

(56) References Cited

U.S. PATENT DOCUMENTS

| | | | | |
|---|---|---|---|---|
| 7,039,358 | B1* | 5/2006 | Shellhammer et al. | 455/41.2 |
| 7,324,486 | B2* | 1/2008 | Noguchi et al. | 370/336 |
| 8,045,922 | B2* | 10/2011 | Sherman et al. | 455/41.2 |
| 8,340,580 | B1* | 12/2012 | Epstein | 455/63.1 |
| 2002/0052181 | A1 | 5/2002 | Tsai et al. | |
| 2004/0192222 | A1 | 9/2004 | Vaisanen et al. | |
| 2006/0211372 | A1* | 9/2006 | Shellhammer et al. | 455/41.2 |

(Continued)

FOREIGN PATENT DOCUMENTS

| | | |
|---|---|---|
| CN | 1801809 | 7/2006 |
| CN | 1893382 | 1/2007 |

(Continued)

OTHER PUBLICATIONS

European Patent Office Application Serial No. 08171511.2, Search Report dated May 15, 2013, 7 pages.

*Primary Examiner* — Junpeng Chen
(74) *Attorney, Agent, or Firm* — Lee, Hong, Degerman, Kang & Waimey

(57) ABSTRACT

A terminal and method of improving interference in a terminal are provided, by which interference generated from implementing a plurality of wireless communication technologies can be improved. The terminal includes a first communication module implemented by a first wireless communication technology and a controller determining that interference is generated by at least one of the first wireless communication technology or a second wireless communication technology and performing an operation to improve the generated interference, the second wireless communication technology implementing a second communication module provided in the terminal or in a different terminal.

18 Claims, 33 Drawing Sheets

(56) References Cited

U.S. PATENT DOCUMENTS

2006/0239223 A1\* 10/2006 Sherman et al. ............. 370/329
2007/0135162 A1   6/2007 Banerjea et al.
2007/0224935 A1   9/2007 Waxman

FOREIGN PATENT DOCUMENTS

| EP | 1838040 | 9/2007 |
| JP | 2004-343559 | 12/2004 |

\* cited by examiner

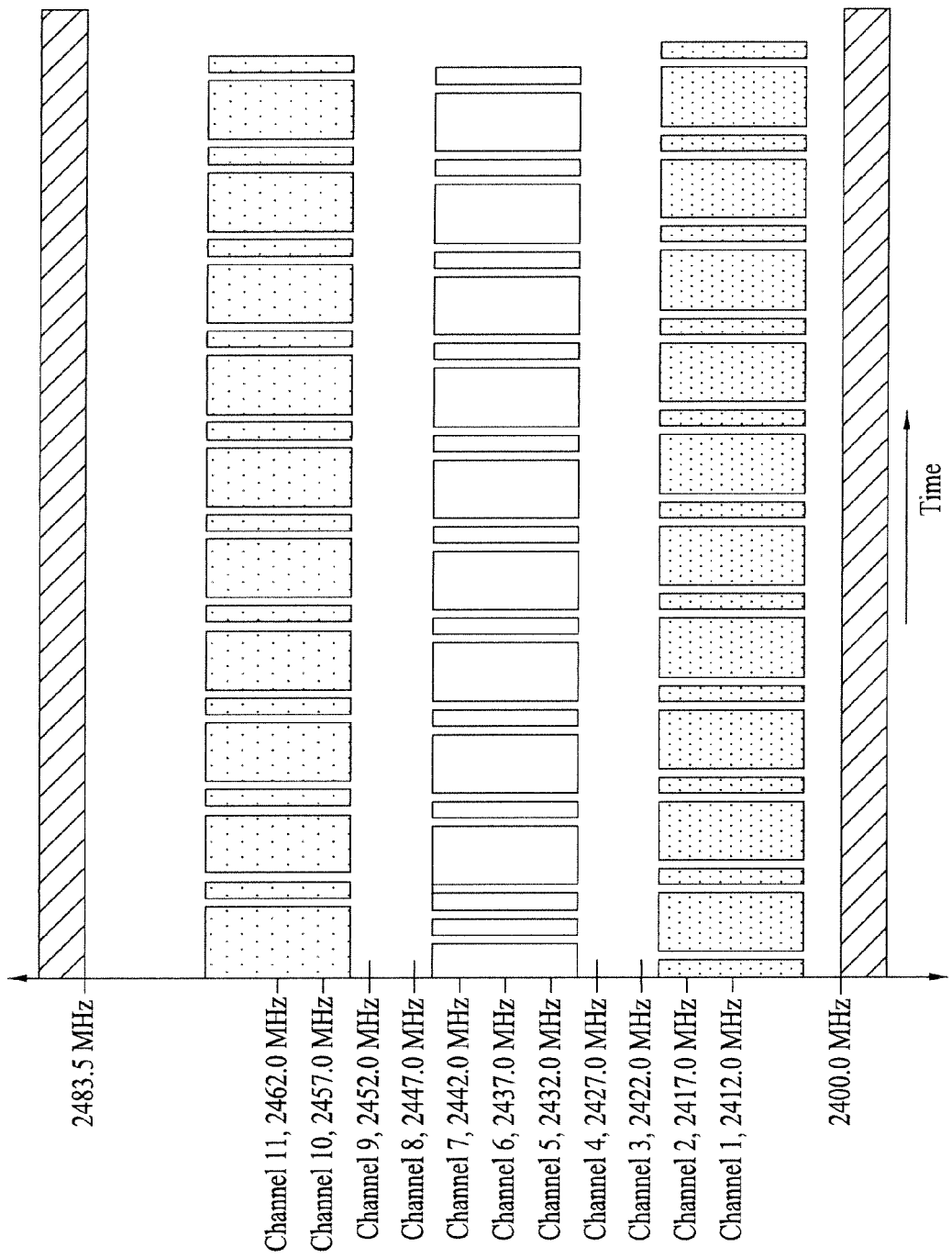

FIG. 5B

| WLAN Channel Allocation Table ||
|---|---|
| Channel No. | Center Frequency (MHz) |
| Start | 2400 |
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |
| 13 | 2472 |
| stop | 2483.5 |
| 14 | 2484 |

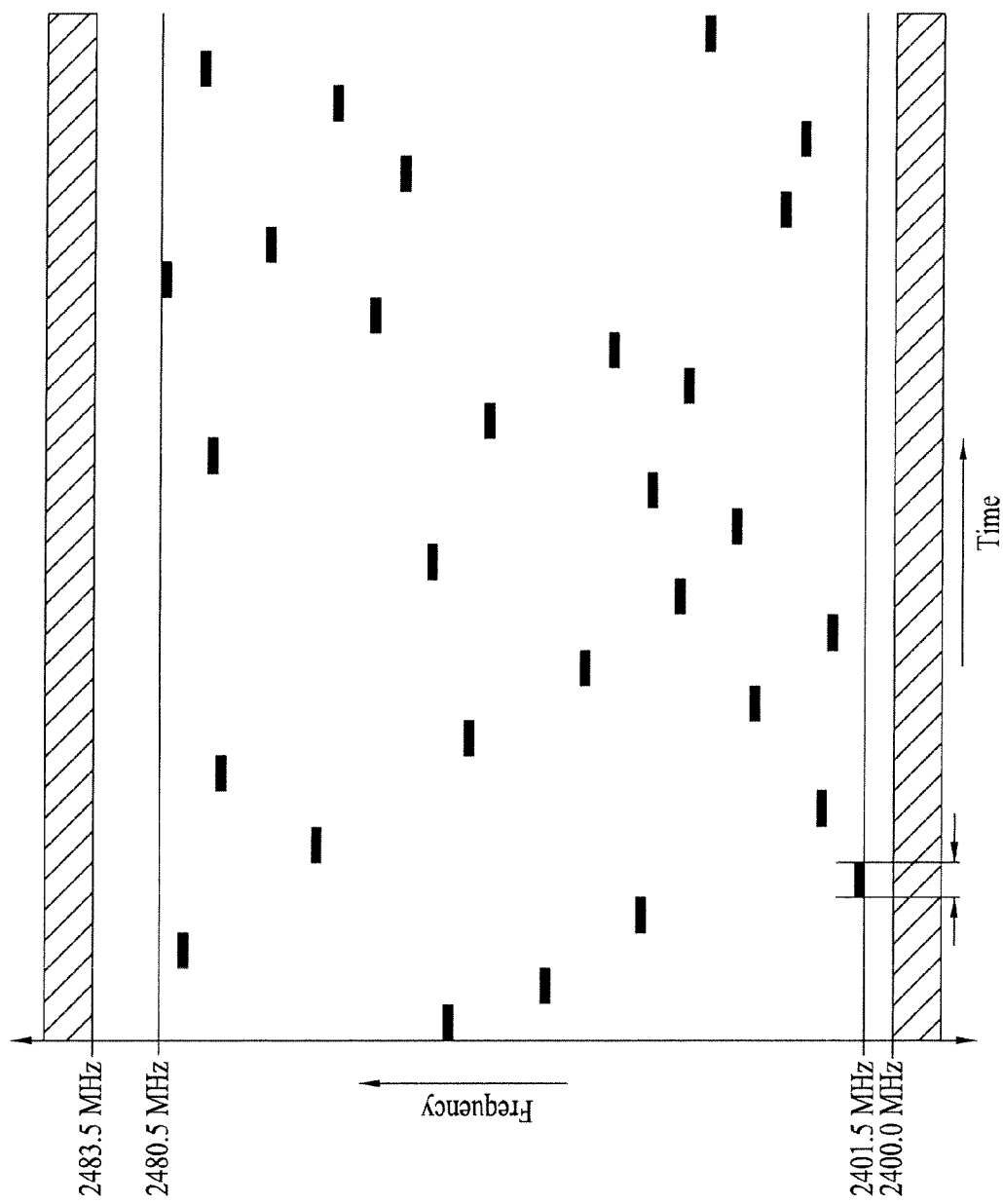

FIG. 11
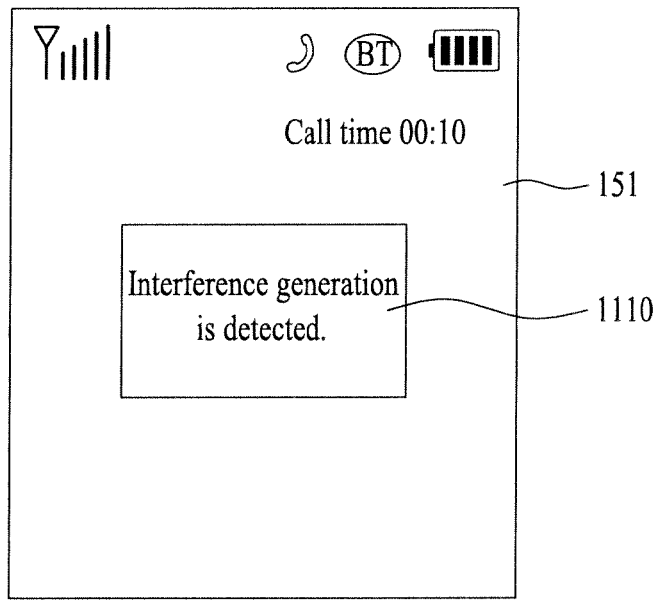
(a)
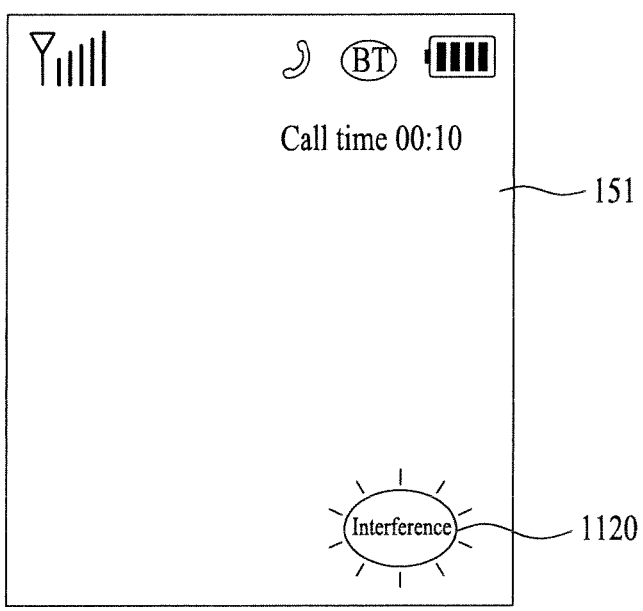
(b)

FIG. 14
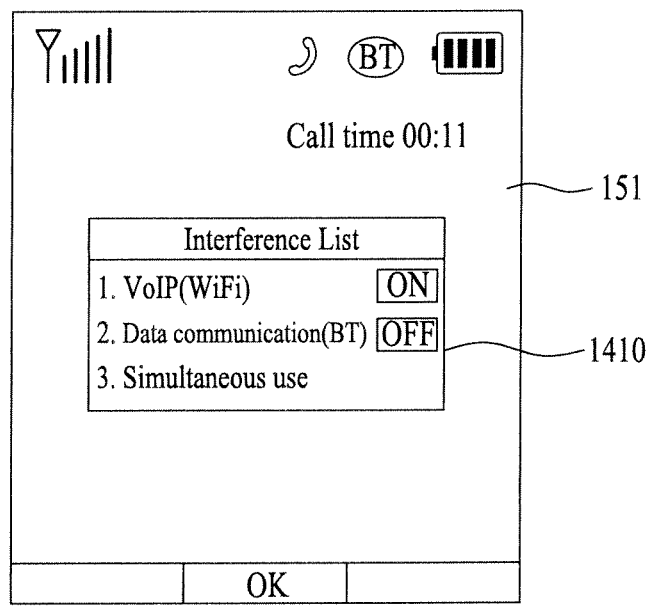
(a)
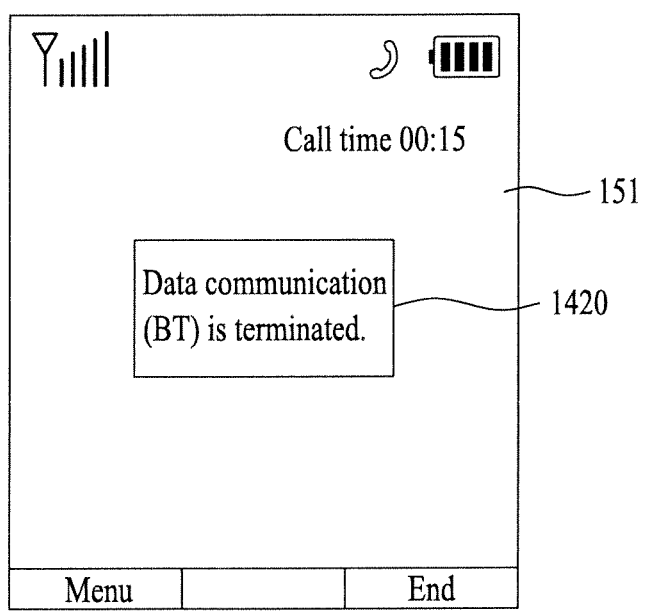
(b)

FIG. 16
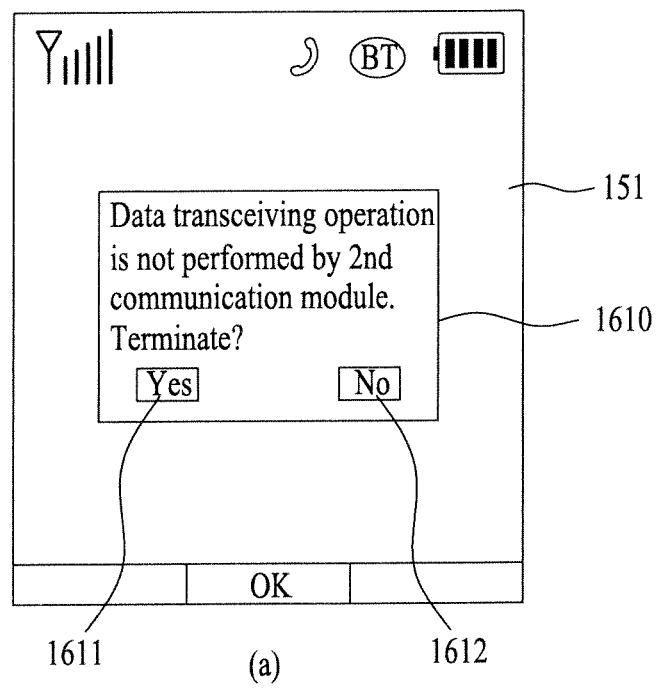
(a)
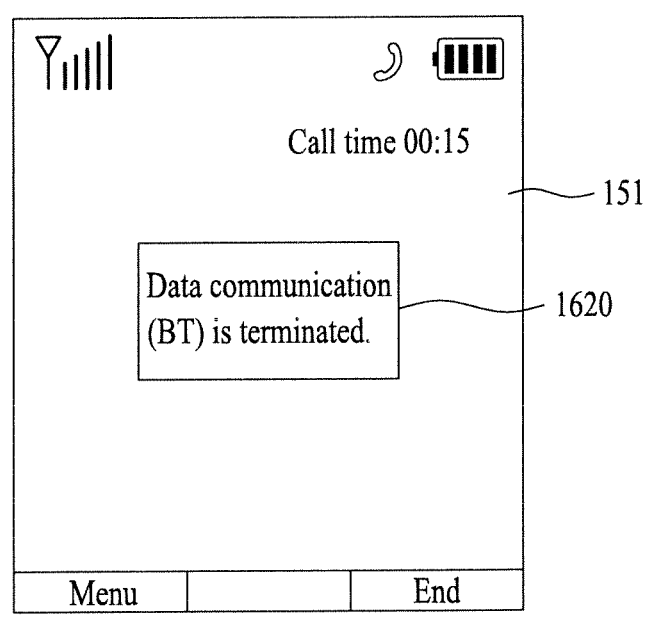
(b)

FIG. 18
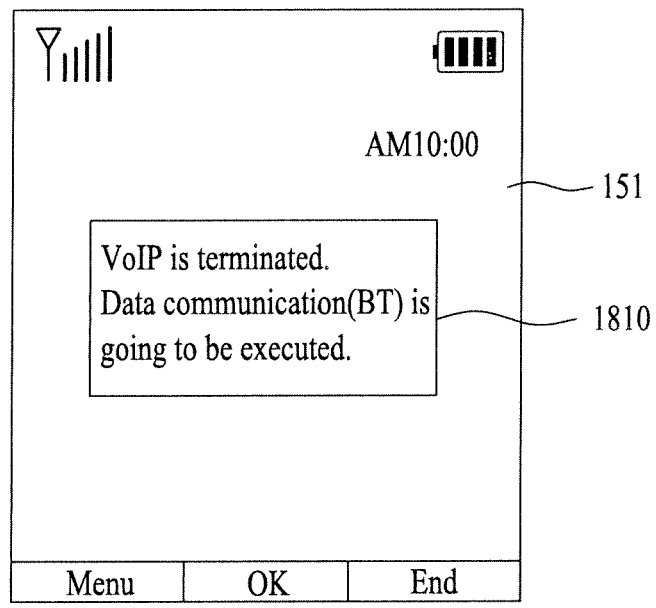
(a)
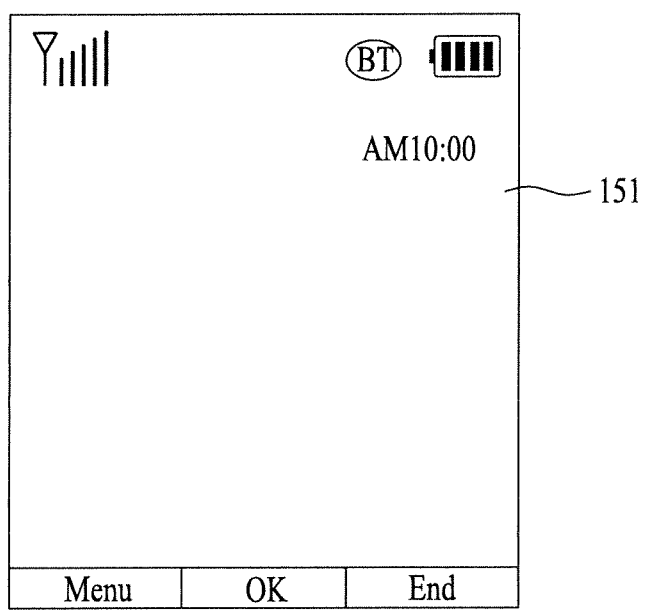
(b)

FIG. 19
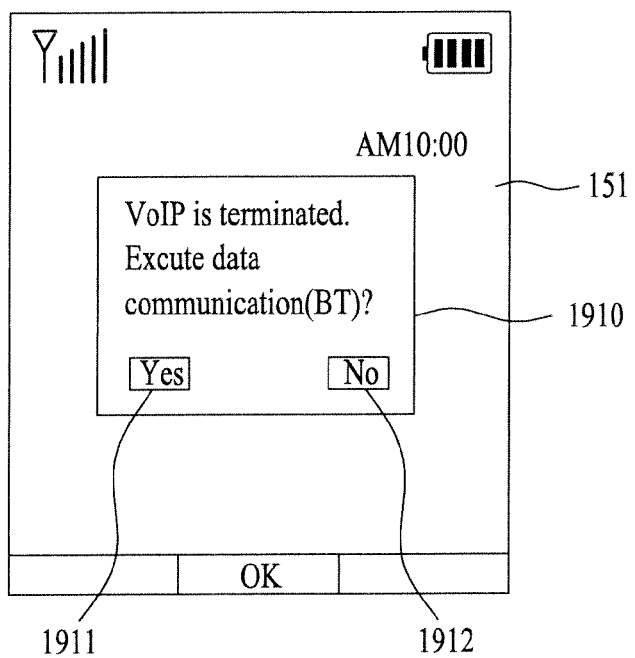
(a)
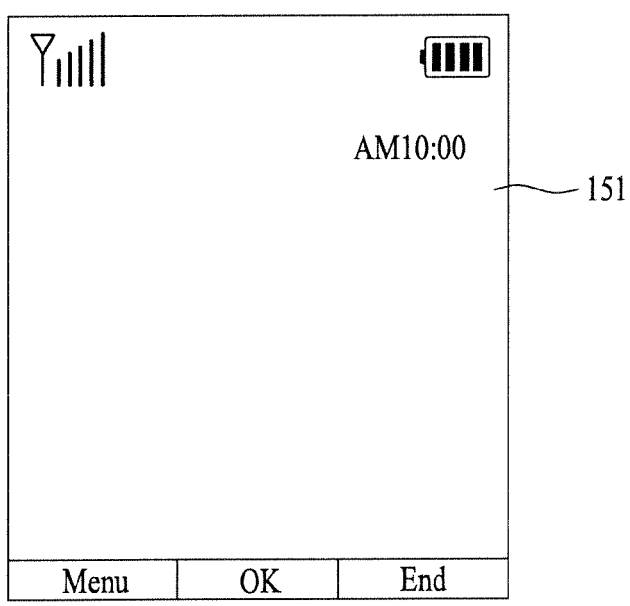
(b)

FIG. 21
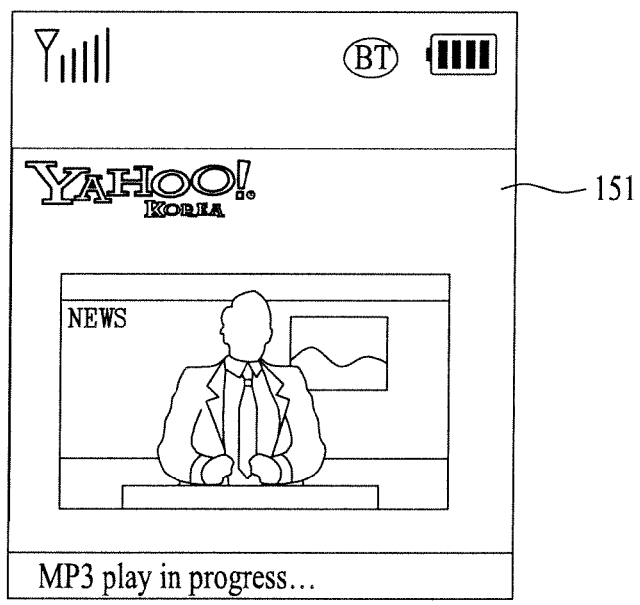
(a)
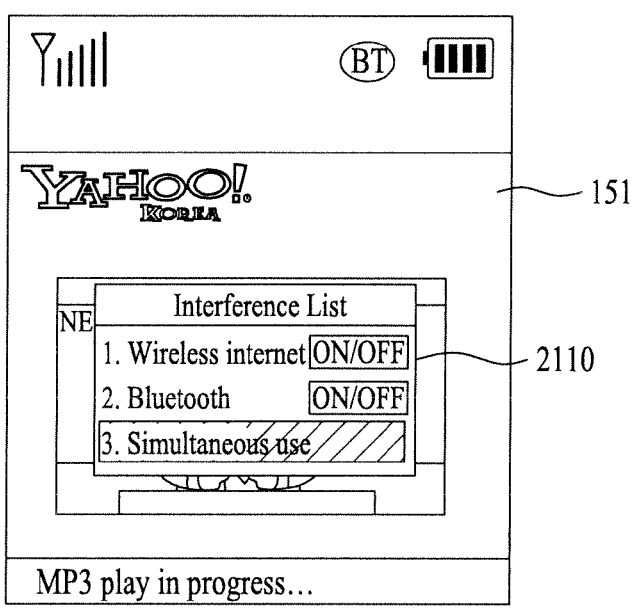
(b)

FIG. 28
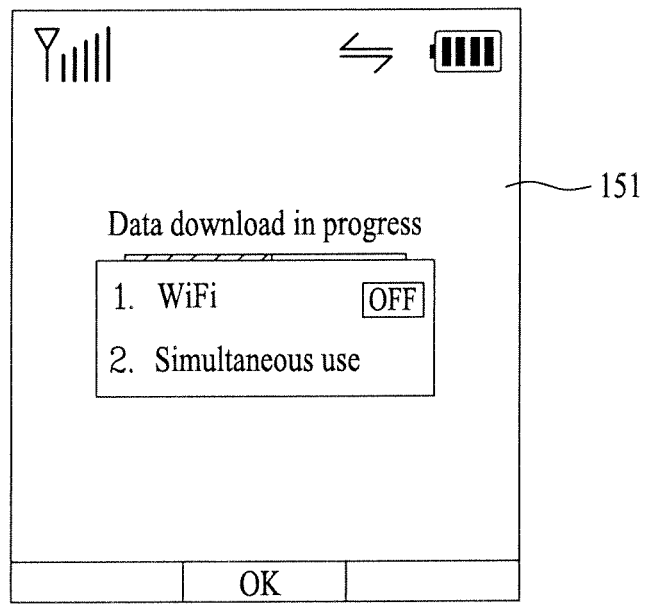
(a)
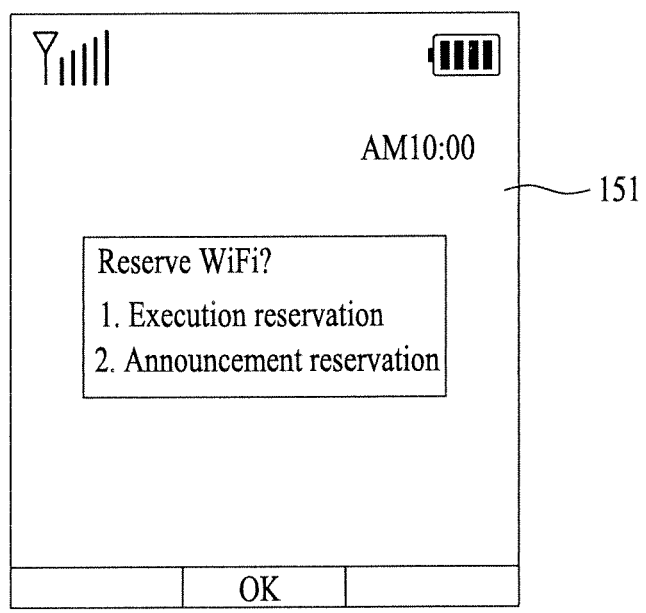
(b)

FIG. 29
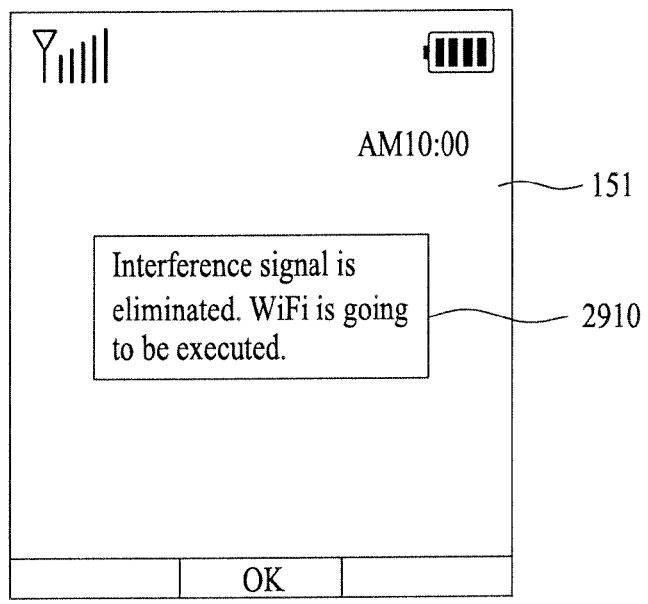
(a)
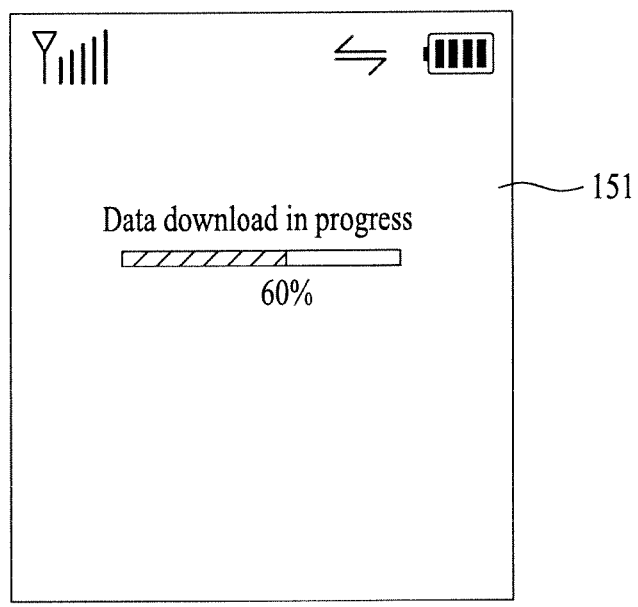
(b)

FIG. 30
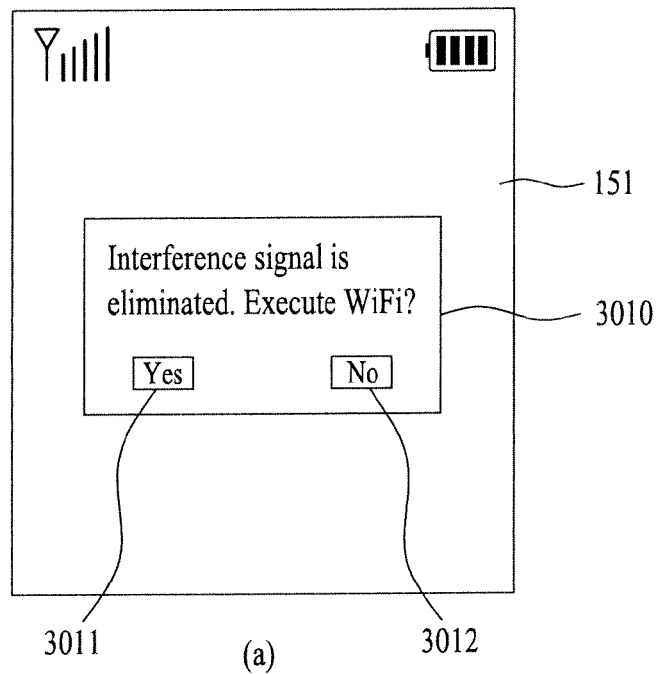
(a)
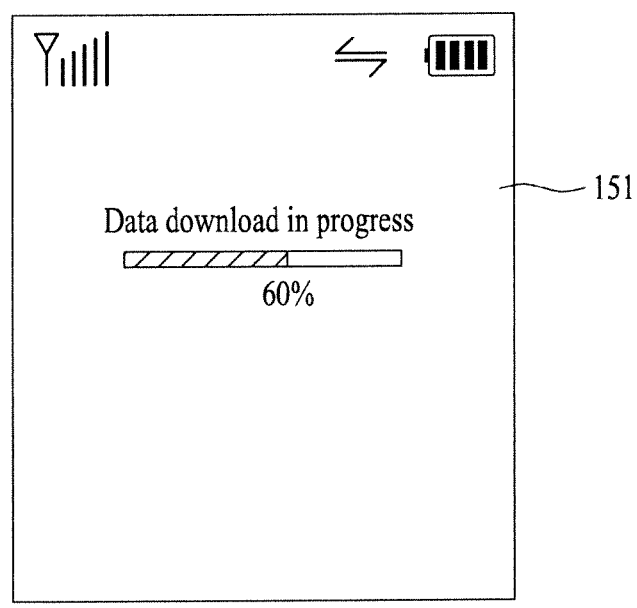
(b)

TERMINAL AND METHOD OF IMPROVING INTERFERENCE IN A TERMINAL

CROSS-REFERENCE TO RELATED APPLICATIONS

Pursuant to 35 U.S.C. §119(a), this application claims the benefit of earlier filing date and right of priority to Korean Application No. 10-2008-0029923, filed on Mar. 31, 2008, the contents of which is incorporated by reference herein in its entirety.

FIELD OF THE INVENTION

The present invention is directed to a terminal, and more particularly, to a terminal and method of improving interference in a terminal. Although the present invention is suitable for a wide scope of applications, it is particularly suitable for improving interference of a terminal incorporating a wireless communication technology.

DESCRIPTION OF THE RELATED ART

A terminal is a device that may be configured to perform various functions. Examples of such functions include data and voice communications, capturing images and video via a camera, recording audio, playing music files via a speaker system, and displaying images and video on a display.

Some terminals include additional functionality that supports game playing, while other terminals are configured as multimedia players. Terminals have also been configured to receive broadcast and multicast signals that permit viewing of content such as videos and television programs.

Efforts are ongoing to support and increase the functionality of terminals. Such efforts include software and hardware improvements, as well as changes and improvements in the structural components that form a terminal. Terminals are now capable of supporting at least one wireless communication technology When a terminal supports a wireless communication technology, a peripheral wireless communication device that supports a wireless communication technology using the same or neighbor frequency band of the wireless communication technology used by the terminal may cause interference. If a terminal supports a plurality of wireless communication technologies, interference can be generated between the plurality of wireless communication technologies if they use the same or neighbor frequency bands. This interference increases the error rate of a wireless signal in a wireless communication system or degrades signal performance.

SUMMARY OF THE INVENTION

In one aspect of the present invention, a terminal is provided. The terminal includes a first communication module implemented by a first wireless communication technology and a controller determining that interference is generated by at least one of the first wireless communication technology or a second wireless communication technology and performing an operation to improve the generated interference, wherein the second wireless communication technology implements a second communication module provided either in the terminal or in a different terminal.

It is contemplated that each of the first and second wireless comprises at least one of WiFi®, WiBro®, WiMAX®, Bluetooth®, RFID®, or Zigbee®. It is further contemplated that the controller determines that interference is generated by the first and second wireless communication technologies if the first and second communication modules are provided in the terminal and both the first and second communication terminals are simultaneously driven.

It is contemplated that the terminal includes an output unit outputting information relevant to the generated interference under control of the controller as part of the improvement operation. It is further contemplated that the information relevant to the interference generation comprises at least one of an announcement of the determined interference generation, information relevant to operations of the first and second communication modules or information related to selectively driving the first and second communication modules.

It is contemplated that the controller performs the improvement operation by selectively terminating either the first or second communication module and driving the non-terminated communication module. It is further contemplated that the controller performs the improvement operation by either indicating that the selectively terminated communication module is drivable or driving the selectively terminated communication module upon termination of the driving of the non-terminated communication module.

It is contemplated that the controller selects to terminate either the first or second communication module according to significance of an operation performed by each of the first and second communication modules. It is further contemplated that the controller selects to terminate either the first or second communication module according to a presence or non-presence of data transmission/reception for a predetermined period of time for each of the first and second communication modules.

It is contemplated that the controller guarantees operation performance of each of the first and second communication modules according to significance of an operation performed by each of the first and second communication modules and the controller drives the first and second communication modules according to the guaranteed operational performance. It is further contemplated that the controller determines that interference is generated by the second wireless communication technology upon searching for the second communication module if the second communication module is provided in the different terminal.

It is contemplated that the terminal includes an output unit outputting information relevant to the generated interference under control of the controller as part of the improvement operation. It is further contemplated that the information relevant to the interference generation comprises at least one of an announcement of the determined interference generation, identification information related to the second communication module, or information related to selectively driving the first and second communication modules.

It is contemplated that the controller delays driving the first communication module as part of the improvement operation and either indicates that the first communication module is drivable or drives the first communication module when the driving of the second communication module is terminated. It is further contemplated that the controller replaces either the first or second wireless communication technology with a third wireless communication technology that uses a different frequency band as part of the improvement operation if the first and second wireless communication technologies use the same frequency band.

In another aspect of the present invention, a method of improving interference in a terminal is provided. The method includes driving a first communication module implemented by a first wireless communication technology, determining that interference is generated by at least one of the first wireless communication technology or a second wireless communication technology and performing an operation to improve the generated interference according to a result of the determination, wherein the second wireless communication technology implements a second communication module provided either in the terminal or in a different terminal.

It is contemplated that performing the improvement operation comprises outputting information relevant to the generated interference. It is further contemplated that the interference is determined as generated by the first and second wireless communication technologies if the first and second communication modules are provided in the terminal and both the first and second communication terminals are simultaneously driven.

It is contemplated that performing the improvement operation comprises selectively terminating either the first or second communication module and driving the non-terminated communication module. It is further contemplated that performing the improvement operation comprises indicating that the selectively terminated communication module is drivable or driving the selectively terminated communication module upon termination of the driving of the non-terminated communication module.

It is contemplated that the method includes setting significance of an operation performed by each of the first and second communication modules and selecting to terminate either the first or second communication module according to the significance. It is further contemplated that the method includes determining a presence or non-presence of data transmission/reception for a predetermined period of time for each of the first and second communication modules and selecting to terminate either the first or second communication module according to the determination.

It is contemplated that the method includes setting significance of an operation performed by each of the first and second communication modules and guaranteeing operation performance of each of the first and second communication modules according to the significance, wherein performing the improvement operation comprises driving the first and second communication modules according to the guaranteed operational performance. It is further contemplated that the interference is determined as generated by the second wireless communication technology upon searching for the second communication module if the second communication module is provided in the different terminal.

It is contemplated that performing the improvement operation comprises delaying the driving of the first communication module and indicating that the first communication module is drivable or driving the first communication module when the driving of the second communication module is terminated. It is further contemplated that performing the improvement operation comprises replacing either the first or second wireless communication technology with a third wireless communication technology that uses a different frequency band if the first and second wireless communication technologies use the same frequency band.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5A and FIG. 5B illustrate diagrams of frequency band and central frequency according to channels of WiFi®.

FIG. 6A and FIG. 6B illustrate diagrams of a frequency band according to channels of Bluetooth® and a channel selecting method.

FIGS. 11 to 13 illustrate diagrams of a screen for outputting information related to interference generation when internal interference is generated in a terminal according to one embodiment of the present invention.

FIGS. 14 to 19 illustrate diagrams of a screen for selectively terminating/driving a corresponding communication module when internal interference is generated in a terminal according to one embodiment of the present invention.

FIGS. 20 to 22 illustrate diagrams of a screen for simultaneously driving a corresponding communication module when internal interference is generated in a terminal according to one embodiment of the present invention.

FIGS. 28 to 30 are diagrams of a screen for selectively terminating a corresponding communication module when external interference is generated in a terminal according to one embodiment of the present invention.

DETAILED DESCRIPTION OF THE PREFERRED EMBODIMENTS

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

Figure 1:
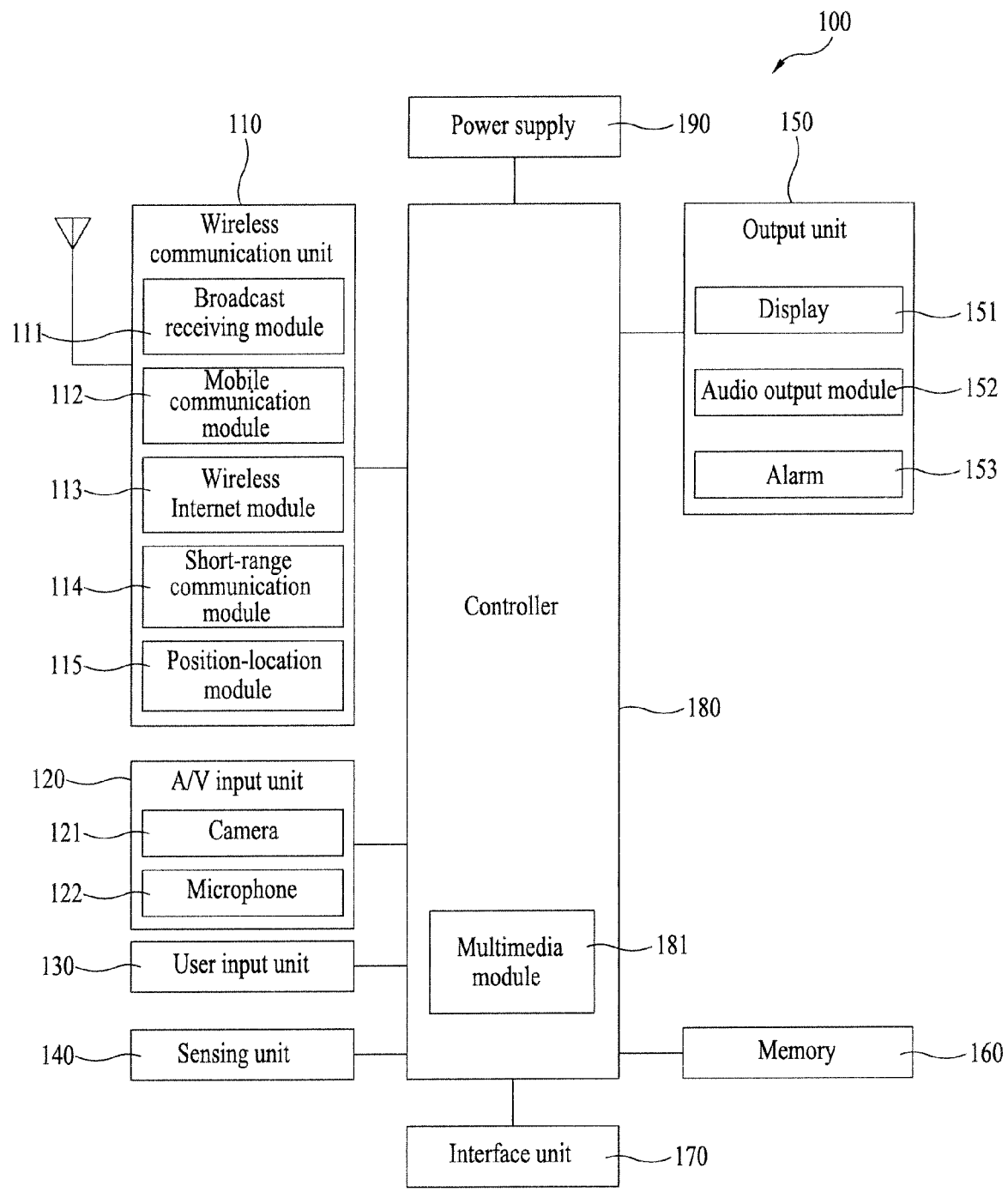
FIG. 1 illustrates a block diagram of a terminal in accordance with an embodiment of the present invention.

FIG. 1 is a block diagram of mobile terminal 100 in accordance with an embodiment of the present invention. The mobile terminal 100 may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components that permit wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel or a terrestrial channel. The broadcast managing entity refers generally to a system that transmits a broadcast signal and/or broadcast associated information. Examples of broadcast associated information include information associated with a broadcast channel, a broadcast program, and a broadcast service provider. For example, the broadcast associated information may include an electronic program guide (EPG) of digital multimedia broadcasting (DMB) and electronic service guide (ESG) of digital video broadcast-handheld (DVB-H).

The broadcast signal may be implemented, for example, as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By way of non-limiting examples, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. Data received by the broadcast receiving module 111 may be stored in a suitable device, such as the memory 160.

The mobile communication module 112 communicates wireless signals with one or more network entities, such as a base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100.

The short-range communication module 114 facilitates relatively short-range communications. Suitable technologies for short-range communication may include, but are not limited to, radio frequency identification (RFID), infrared data association (IrDA), ultra-wideband (UWB), as well at the networking technologies commonly referred to as Bluetooth® and ZigBee®.

The position-location module 115 identifies or otherwise obtains the location of the mobile terminal 100. The position-location module 115 may be implemented using global positioning system (GPS) components that cooperate with associated satellites, network components, and combinations thereof.

The audio/video (A/V) input unit 120 is configured to provide audio or video signal input to the mobile terminal 100. As shown, the A/V input unit 120 includes a camera 121 and a microphone 122.

The camera 121 receives and processes image frames of still pictures or video.

The microphone 122 receives an external audio signal while the mobile terminal 100 is in a particular mode, such as phone call mode, recording mode and voice recognition. This audio signal is processed and converted into digital data. The mobile terminal 100, and specifically the A/V input unit 120, may include assorted noise removing algorithms to remove noise generated in the course of receiving the external audio signal. Data generated by the A/V input unit 120 may be stored in the memory 160, utilized by the output unit 150, or transmitted via one or more modules of the communication unit 110. If desired, two or more microphones and/or cameras may be used.

The user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a touch screen display, which will be described in more detail later.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, orientation or acceleration/deceleration of the mobile terminal.

The mobile terminal 100 may be configured as a slide-type mobile terminal and the sensing unit 140 may sense whether a sliding portion of the mobile terminal is open or closed. The sensing unit 140 may also sense the presence or absence of power provided by the power supply 190, the presence or absence of a coupling or other connection between the interface unit 170 and an external device.

The interface unit 170 may be implemented to couple the mobile terminal 100 with external devices. Typical external devices include wired/wireless headphones, external chargers, power supplies, storage devices configured to store data such as audio, video, and pictures, earphones, and microphones. The interface unit 170 may be configured using a wired/wireless data port, audio input/output ports, video input/output ports, or a card socket for coupling to a memory card, subscriber identity module (SIM) card, user identity module (UIM) card, or a removable user identity module (RUIM) card.

The output unit 150 may include various components that support the output requirements of the mobile terminal 100. The display 151 may be implemented to visually display information associated with the mobile terminal 100. The display 151 may provide a user interface or graphical user interface that includes information associated with placing, conducting, and terminating a phone call if the mobile terminal 100 is operating in a phone call mode. As another example, the display 151 may additionally or alternatively display images that are associated with a video call mode or a photographing mode.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the terminal is in an opened position and a second display 151 configured as an external display viewable in both the open and closed positions.

FIG. 1 further shows the output unit 150 having an audio output module 152, which supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as call received, message received, or errors.

The output unit 150 is further shown having an alarm 153, which may signal or otherwise identify the occurrence of a particular event associated with the mobile terminal 100. Typical events include call received, message received and user input received.

An example of a signal provided by the output unit 150 is a tactile sensation. For example, the alarm 153 may be configured to vibrate responsive to the mobile terminal 100 receiving a call or message. As another example, vibration may be provided by the alarm 153 responsive to receiving user input at the mobile terminal 100 in order to provide a tactile feedback mechanism. It is understood that the various signals provided by the components of output unit 150 may be separately performed, or performed using any combination of such components.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 shown in FIG. 1 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage devices.

The controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. The controller 180 may also implement such embodiments.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals 100.

Figure 2:
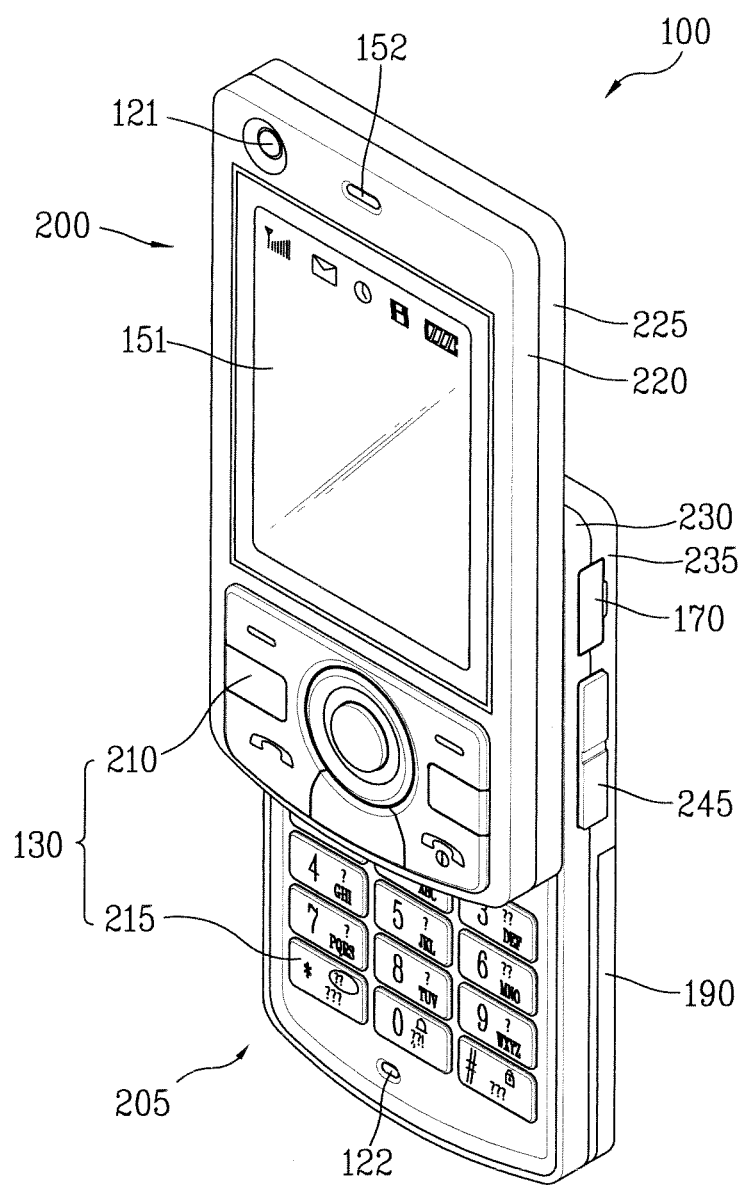
FIG. 2 illustrates a perspective view of a front side of a terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 (described in FIG. 1) is implemented using function keys 210 and a keypad 215. The function keys 210 are located on the first body 200 and the keypad 215 is located on the second body 205. The keypad 215 includes various keys, such as numbers, characters, and symbols to enable a user to place a call, prepare a text or multimedia message, and otherwise operate the mobile terminal 100.

The first body 200 slides relative to the second body 205 between open and closed positions. The first body 200 is positioned over the second body 205 in the closed position such that the keypad 215 is substantially or completely obscured by the first body. User access to the keypad 215, the display 151 and the function keys 210 is facilitated in the open position. The function keys 210 are conveniently configured for a user to enter commands, such as start, stop and scroll.

The mobile terminal 100 is operable in either a standby mode or an active call mode. The mobile terminal 100 is able to receive a call or message and to receive and respond to network control signaling in the standby mode.

The mobile terminal 100 typically operates in the standby mode in the closed position and in the active mode in the open position. This mode configuration may be changed as required or desired.

The first body 200 is shown formed of a first case 220 and a second case 225. The second body 205 is shown formed of a first case 230 and a second case 235. The front case 220 and second case 225 of the first body 200 and the first case 230 and second case 235 or the second body 205 are usually formed of a suitably rigid material, such as injection molded plastic, or formed using metallic material, such as stainless steel (STS) and titanium (Ti).

One or more intermediate cases may be provided between the first case 220 and second case 225 of the first body 200 or between the first case 230 and second case 235 of the second body 205. The first body 200 and second body 205 are typically sized to receive electronic components necessary to support operation of the mobile terminal 100.

The first body 200 is shown having a camera 121 and audio output module 152, which is configured as a speaker, positioned relative to the display 151. The camera 121 may be constructed such that it can be selectively positioned relative to first body 200, such as by rotation or swiveling.

The function keys 210 are positioned adjacent to a lower side of the display 151, which is shown implemented as an LCD or OLED. The display 151 may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of user input unit, positioned along the side of second body. Preferably, the side keys 245 are configured as hot keys, such that the side keys are associated with a particular function of the mobile terminal 100.

An interface unit 170 is shown positioned adjacent to the side keys 245. A power supply 190 in a form of a battery is shown located on a lower portion of the second body 205.

Figure 3:
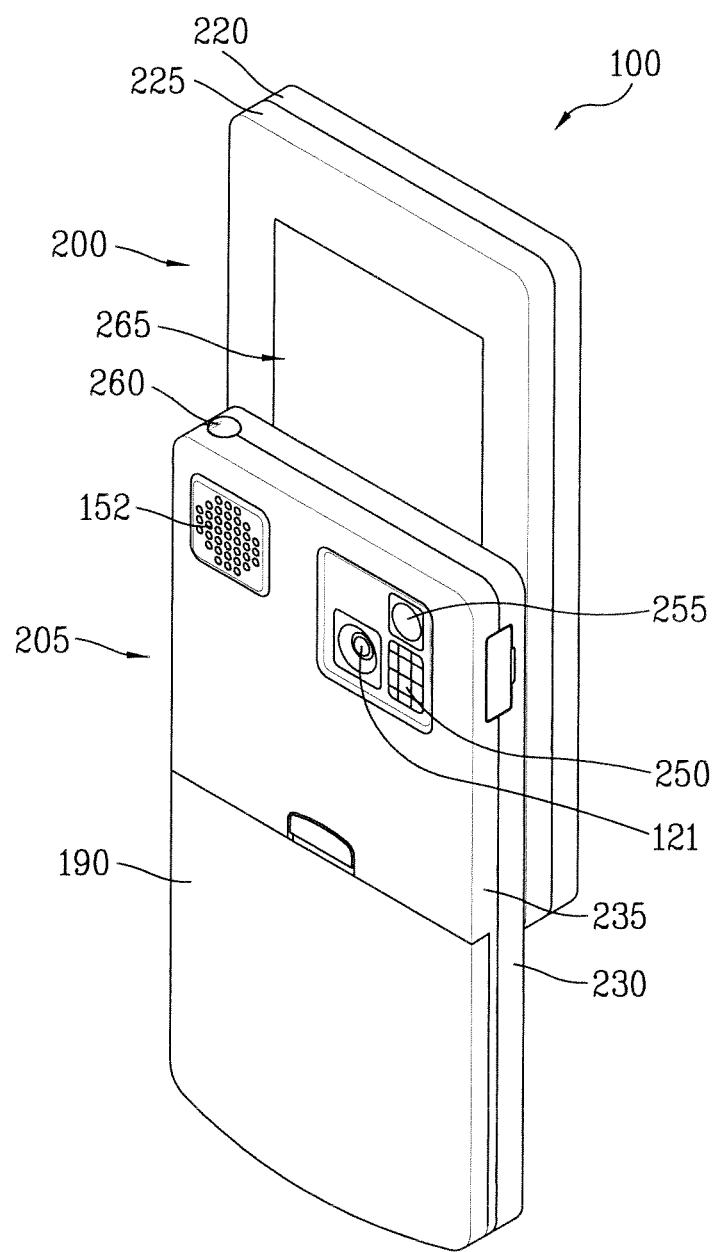
FIG. 3 illustrates a rear view of the terminal illustrated in FIG. 2.

FIG. 3 is a rear view of the mobile terminal shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 illustrated in FIG. 3 faces a direction opposite to a direction faced by the camera 121 of the first body 200 illustrated in FIG. 2. Each of the cameras 121 of the first body 200 and second body 205 may have the same or different capabilities.

The camera 121 of the first body 200 in one embodiment operates with a relatively lower resolution than the camera 121 of the second body 205. Such an arrangement works well during a videoconference, for example, in which reverse link bandwidth capabilities may be limited. The relatively higher resolution of the camera 121 of the second body 205 is useful for obtaining higher quality pictures for later use or for communicating with other parties.

The second body 205 illustrated in FIG. 3 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205 in FIG. 3. The antenna 260 functions in cooperation with the broadcast receiving module 111 illustrated in FIG. 1. The antenna 260 may be fixed or retractable into the second body 205.

The rear side of the first body 200 includes a slide module 265. The slide module 265 slidably couples with a corresponding slide module located on the front side of the second body 205.

It is understood that the arrangement of the various components of the first body 200 and second body 205 illustrated in FIGS. 2 and 3 may be modified as required or desired. For example, some or all of the components of one body may alternatively be implemented on the other body. Further, the location and relative positioning of the components are not critical and, therefore, the components may be positioned at locations that differ from those shown in FIGS. 2 and 3.

The mobile terminal 100 of FIGS. 1-3 may be configured to operate within a communication system which transmits data via frames or packets, including both wireless and wired communication systems and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), the universal mobile telecommunications system (UMTS), the long-term evolution (LTE) of the UMTS, and the global system for mobile communications (GSM). By way of non-limiting example only, further description will relate to a CDMA communication system, but such teachings apply equally to other system types.

Figure 4:
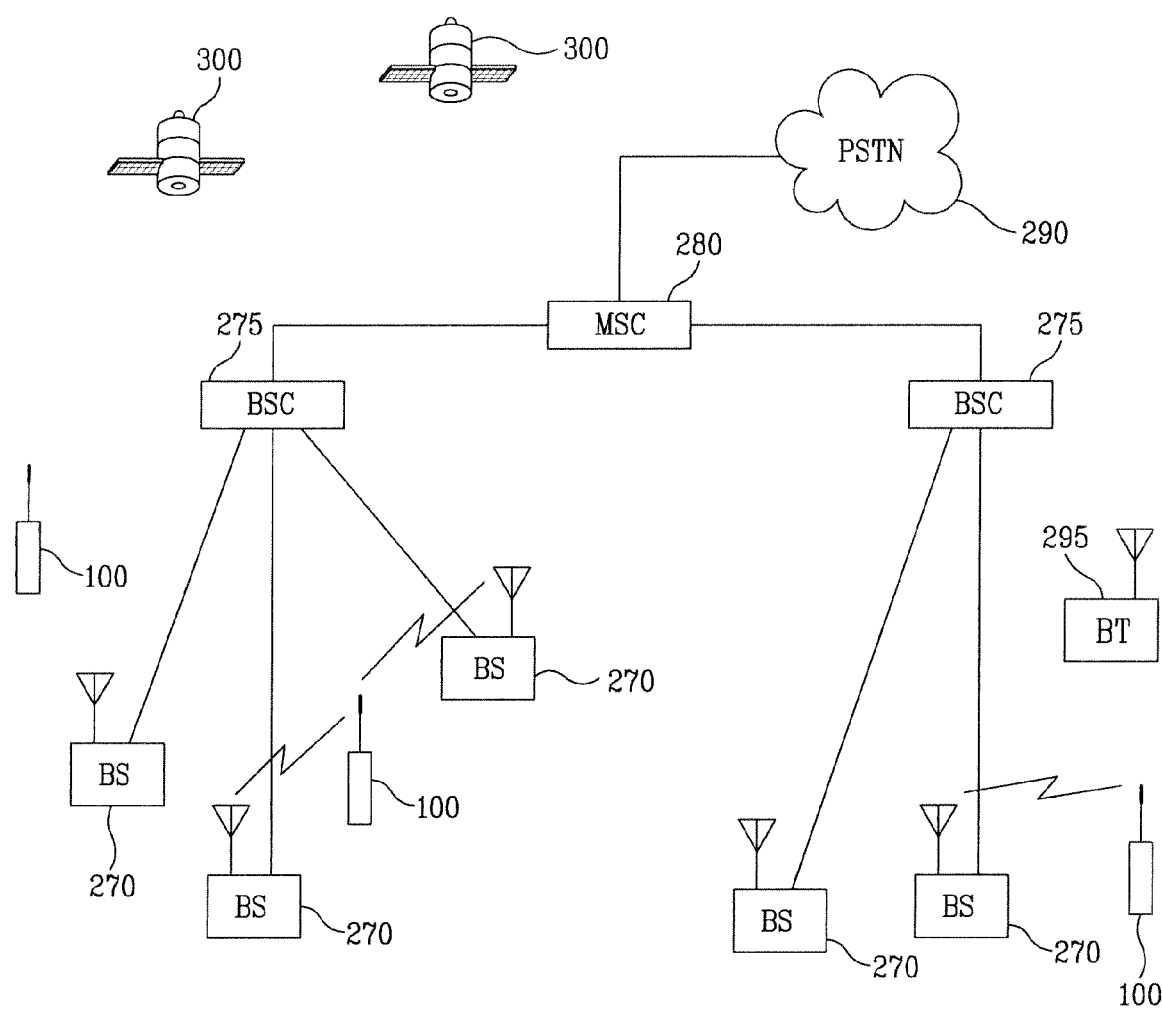
FIG. 4 illustrates a block diagram of a CDMA wireless communication system operable with the terminal illustrated in FIGS. 1-3.

Referring to FIG. 4, a CDMA wireless communication system is shown having a plurality of mobile terminals 100, a plurality of base stations (BS) 270, a plurality of base station controllers (BSC) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omni-directional antenna or an antenna pointed in a particular direction radially away from the base station. Alternatively, each sector may include two antennas for diversity reception. Each BS 270 may be configured to support a plurality of frequency assignments each having a particular spectrum, such as 1.25 MHz or 5 MHz.

The intersection of a sector and frequency assignment may be referred to as a CDMA channel. The BSs 270 may also be referred to as base station transceiver subsystems (BTSs).

The term "base station" may be used to refer collectively to a BSC 275 and one or more BSs 270. The BSs 270 may also be denoted as "cell sites." Alternatively, individual sectors of a given BS 270 may be referred to as "cell sites."

A terrestrial digital multimedia broadcasting (DMB) transmitter (BT) 295 is shown broadcasting to the mobile terminals 100 operating within the system. The broadcast receiving module 111 illustrated in FIG. 1 may be configured to receive broadcast signals transmitted by the BT 295. Similar arrangements may be implemented for other types of broadcast and multicast signaling as discussed above.

FIG. 4 further depicts several global positioning system (GPS) satellites 300 that facilitate locating the position of some or all of the mobile terminals 100. Two satellites 300 are depicted, but it is understood that useful positioning information may be obtained with greater or fewer satellites.

The position-location module 115 illustrated in FIG. 1 may be configured to cooperate with the satellites 300 to obtain desired position information. It is to be appreciated that other types of position detection technology may alternatively be implemented, such as location technology that may be used in addition to or instead of GPS location technology. If desired, some or all of the GPS satellites 300 may alternatively or additionally be configured to provide satellite DMB transmissions.

During typical operation of the wireless communication system, the BSs 270 receive sets of reverse-link signals from various mobile terminals 100. The mobile terminals 100 perform calls, messaging, and other communications.

Each reverse-link signal received by a given BS 270 is processed within that BS. The resulting data is forwarded to an associated BSC 275.

The BSC 275 provides call resource allocation and mobility management functionality including soft handoffs between the BSs 270. The BSCs 275 also route the received data to the MSC 280, which provides additional routing services for interfacing with the PSTN 290.

Similarly, the PSTN 290 interfaces with the MSC 280, which interfaces with the BSCs 275. The BSCs 275 control the BSs 270 to transmit sets of forward-link signals to the mobile terminals 100.

For clarity and convenience of explanation, the following description assumes that a terminal includes at least one of the elements shown in FIG. 1. Prior to the detailed description of the present invention, wireless communication technologies according to frequency band are explained.

In wireless communication technologies mutually, using different frequency bands interference can be generated between WiBro® operating on 2.3 GHz, WiFi®/Bluetooth®/RFID/Zigbee® operating on 2.4 GHz and WiMAX® operating on 2.5 GHz. For example, if both guard bands of the 2.4 GHz band are allocated to a Bluetooth® channel, interference can be caused with WiBro® on 2.3 GHz or WiMAX® on 2.5 GHz.

In wireless communication technologies using the same frequency band, such as the 2.4 GHz band or the industrial, scientific and medical (ISM) band, interference can be caused between WiFi®, Bluetooth®, RFID and Zigbee®. For example, if both WiFi® and Bluetooth® are simultaneously implemented, Bluetooth® can select a channel from the any area except the WiFi® channel and may cause interference on a neighbor band of the WiFi® channel.

IEEE 802.15.2 specifically defines a situation where wireless communication technologies of wireless local area networks (WLAN) and wireless personal area networks (WPAN) are simultaneously implemented in a single terminal. WiFi® is an example of WLAN and Bluetooth® is an example of WPAN. This will be explained later.

Channel allocations of WiFi® and Bluetooth® implemented on the ISM band are explained in detail with reference to FIGS. 5A to 6B. FIG. 5A and FIG. 5B illustrate diagrams of frequency band and central frequency according to channels of WiFi® and FIG. 6A and FIG. 6B illustrate diagrams of a frequency band according to channels of Bluetooth® and a channel selecting method.

As illustrated in FIG. 5A and FIG. 5B, WiFi® is constructed with 14 total channels differing slightly according to country. Currently, channel 14 is barely used and channels are allocated in order to leave 5 MHz for inter-channel central frequency spacing.

Figure 6B:
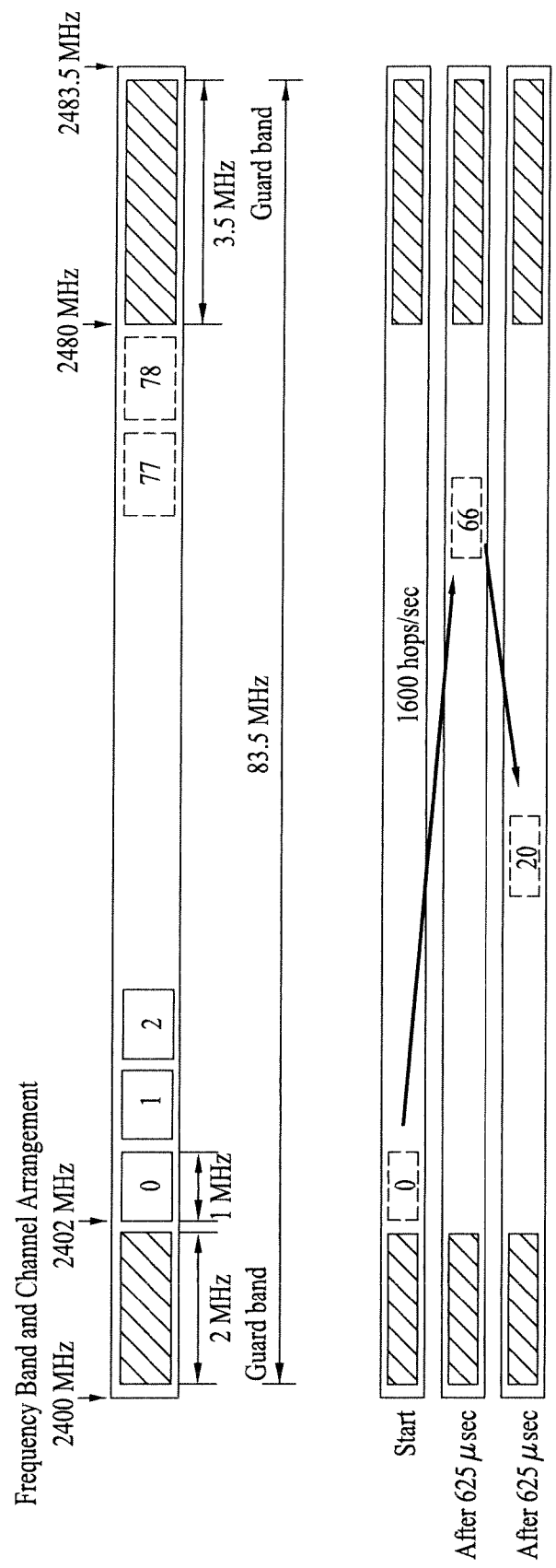

Referring to FIG. 6A and FIG. 6B, Bluetooth® is constructed with 79 total channels, each of which has a carrier spacing of 1 MHz. Bluetooth® performs frequency hopping 1,600 times per second and has 625 μsec per slot according to Time Division Duplex.

For example, if WiFi® and Bluetooth® are simultaneously implemented in a single terminal or separately implemented in different terminals, Bluetooth® can perform frequency hopping on all bands except channels allocated to WiFi®. This process is called 'selective frequency hopping'.

IEEE 802.15.2 proposes a scheme for suppressing channel interference when WiFi® and Bluetooth® are simultaneously implemented as well as selective frequency hopping. This will be explained in detail later.

For clarity and convenience of description, it is assumed that each of the first and second wireless technologies in the following description may include WiFi® or Bluetooth®. It is understood that the first and second wireless communication technologies can include any wireless communication technologies that may cause interference with each other and may have the same frequency band or different frequency bands.

Communication modules implemented by WiFi®, Bluetooth®, WiBro® and WiMAX® can be named, respectively, WiFi® module, Bluetooth® module, WiBro® module and WiMAX® module. The WiFi® module, WiBro® module and WiMAX® module are examples of the wireless Internet module 113 and the Bluetooth® module is an example of the short-range communication module 114 illustrated in FIG. 1.

Figure 7:
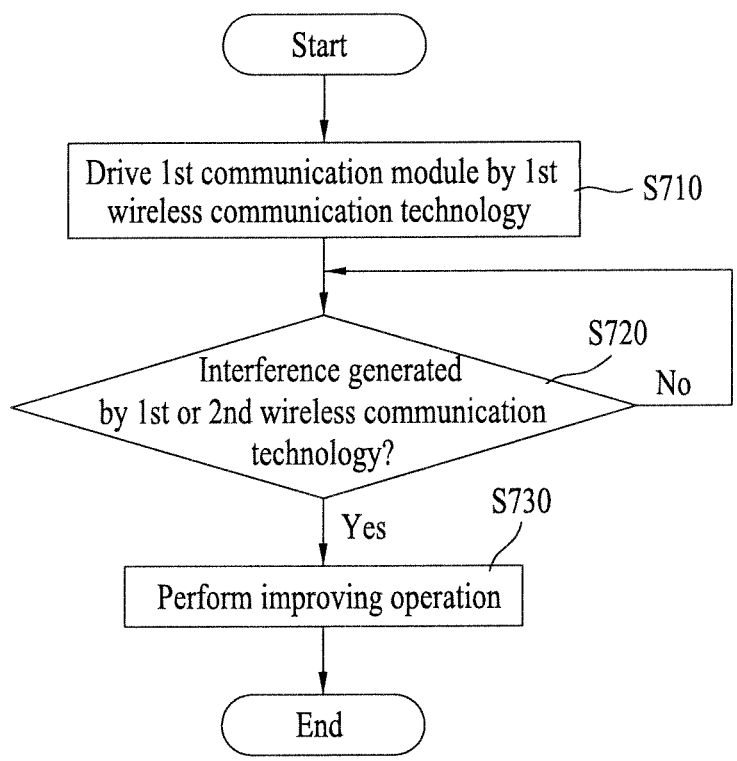
FIG. 7 illustrates a flowchart of a method of improving interference in a terminal according to one embodiment of the present invention.

A method of improving interference in a terminal according to the present invention is explained with reference to FIG. 7. FIG. 7 is a flowchart for a method of improving interference in a terminal according to one embodiment of the present invention.

As illustrated in FIG. 7, the terminal 100 drives a first communication module implemented by a first wireless communication technology [S710]. For example, if the first wireless communication technology is WiFi®, the first communication module is the wireless Internet module 113. On the other hand, if the first wireless communication technology is Bluetooth®, the first communication module can include the short-range communication module 114.

If the first wireless communication technology is WiFi®, the terminal 100 accesses the wireless Internet by driving the first communication module, connects a call using Voice over Internet Protocol (VoIP), and performs data communication or video streaming. If the first wireless communication technology is Bluetooth®, the terminal 100 performs data communication or transmits audio signals to an external audio output device for Bluetooth®, such as earphones, a headset or speakers, by driving the first communication module.

The terminal 100 determines if interference is generated by at least one of the first and second wireless communication technologies [S720]. The controller 180 can perform the determination.

The second wireless communication technology can implement a second communication module provided in the terminal 100, an external terminal or an extreme communication device. For example, the second communication module can include the wireless Internet module 113 or the short-range communication module 114 according to whether the second wireless communication technology includes WiFi® or Bluetooth®.

If both of the first and second communication modules are provided in the terminal 100, the terminal determines that the interference is generated upon detecting the activation of the first and second communication modules [S720]. This type of interference is called 'internal interference'. For example, the activation may include the first and second communication modules being driven at a predetermined timing point or maintaining powered-on states.

If the first communication module and the second communication module are provided in, respectively, the terminal 100 and the external terminal, the terminal 100 searches for the second communication module upon detecting that signal performance by the first communicate module is equal to or less than a predetermined reference. The terminal 100 is able to determine that interference is generated when the second module is searched. This type of interference is called 'external interference'.

The generation of internal interference in the terminal 100 will be explained in detail with reference to FIGS. 8A to 8G. FIGS. 8A to 8G illustrate situations in which internal interference is generated in a terminal 100 according to one embodiment of the present invention. For clarity and convenience of the following description, it is assumed that the first wireless communication technology is Bluetooth® and the second wireless communication technology is WiFi®.

Figure 8A:
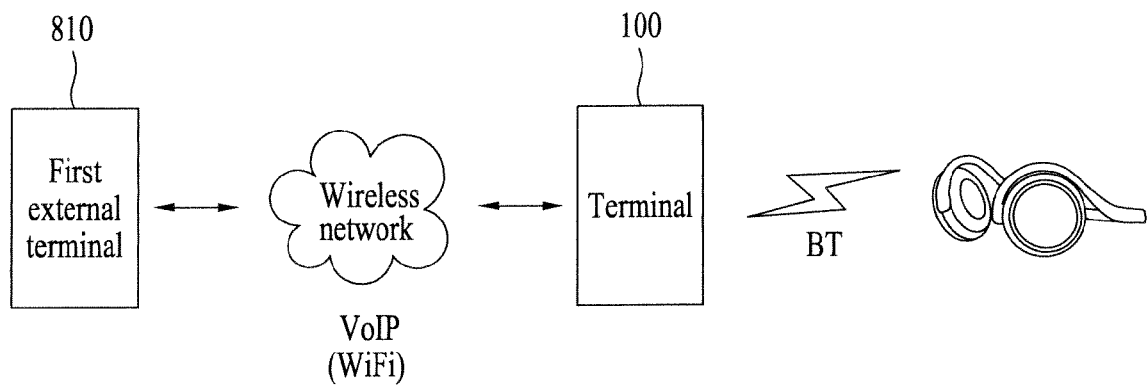
FIGS. 8A to 8G illustrate diagrams of situations in which internal interference is generated in a terminal according to one embodiment of the present invention.

As illustrated in FIG. 8A, an audio signal is output as a result of driving a Bluetooth® module according to a VoIP call connection between the terminal 100 and the first external terminal 810 while using an external Bluetooth® headset with the VoIP call connection performed by driving a WiFi® module. The terminal 100 determines if internal interference is generated [S720].

Figure 8B:
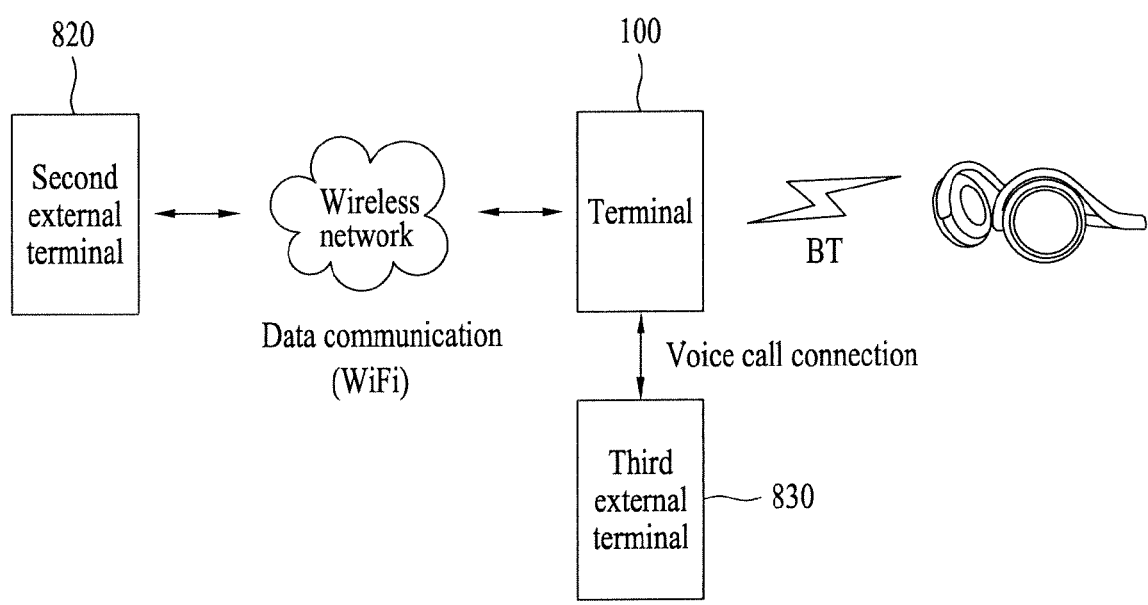

As illustrated in FIG. 8B, an audio signal is output as a result of driving a Bluetooth® module according to a voice call connection between the terminal 100 and the third external terminal 830 while using an external Bluetooth® headset with data communication, which is performed by driving a WiFi® module, between the terminal 100 and the second external terminal 820. The terminal 100 determines if internal interference is generated [S720].

Figure 8C:
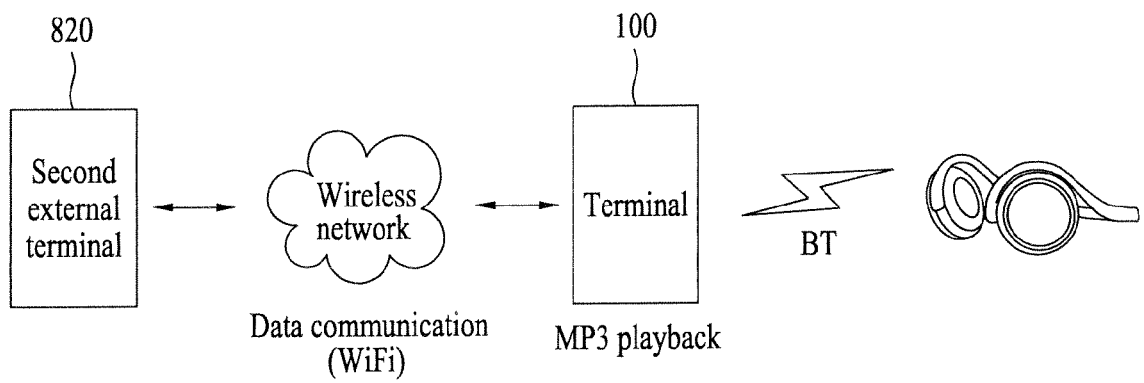

As illustrated in FIG. 8C, an audio signal is output as a result of driving a Bluetooth® module according to an MP3 file playback while using an external Bluetooth® headset with data communication, which is performed by driving a WiFi® module, between the terminal 100 and the second external terminal 820. The terminal 100 determines if internal interference is generated [S720].

Figure 8D:
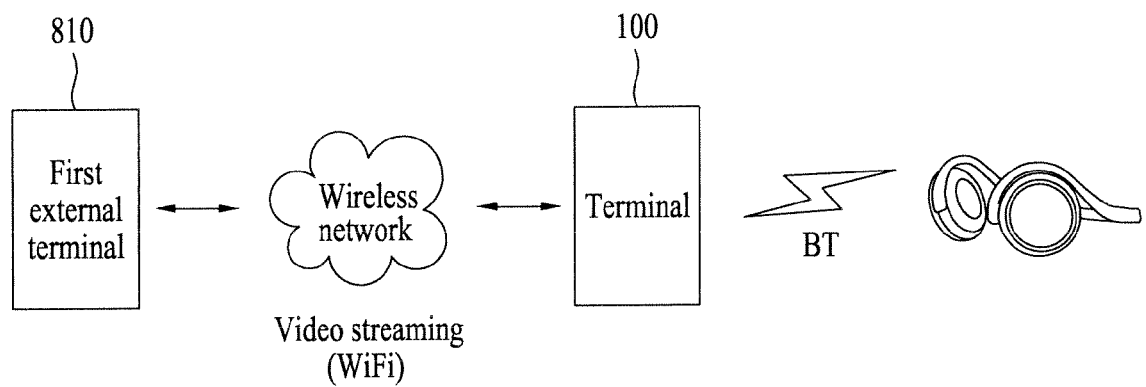

As illustrated in FIG. 8D, an audio signal is output as a result of driving a Bluetooth® module according to a video streaming from the first external terminal 810 to the terminal 100 while using an external Bluetooth® headset with the video streaming performed by driving a WiFi® module. The terminal 100 determines if internal interference is generated [S720].

Figure 8E:
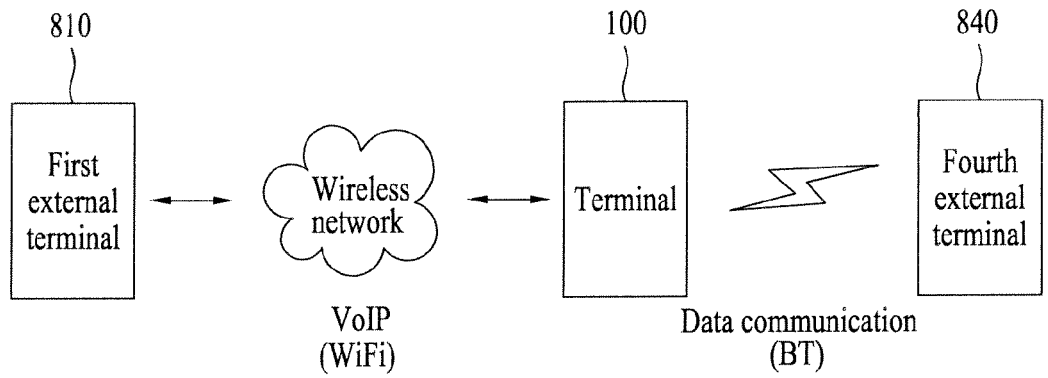

As illustrated in FIG. 8E, data communication between the terminal 100 and the fourth external terminal 840 is performed as a result of driving a Bluetooth® module with a VoIP call connection, which is performed by driving a WiFi® module, between the terminal 100 and the first external terminal 810. The terminal 100 determines if internal interference is generated [S720].

Figure 8F:
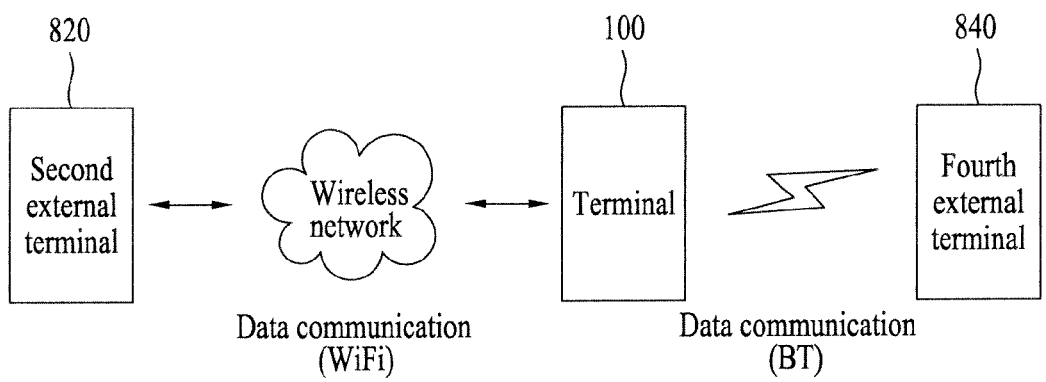

As illustrated in FIG. 8F, data communication between the terminal 100 and the fourth external terminal 840 is performed as a result of driving a Bluetooth® module and data communication between the terminal 100 and the second external terminal 820 is performed as a result of driving a WiFi® module. The terminal 100 determines if internal interference is generated [S720].

Figure 8G:
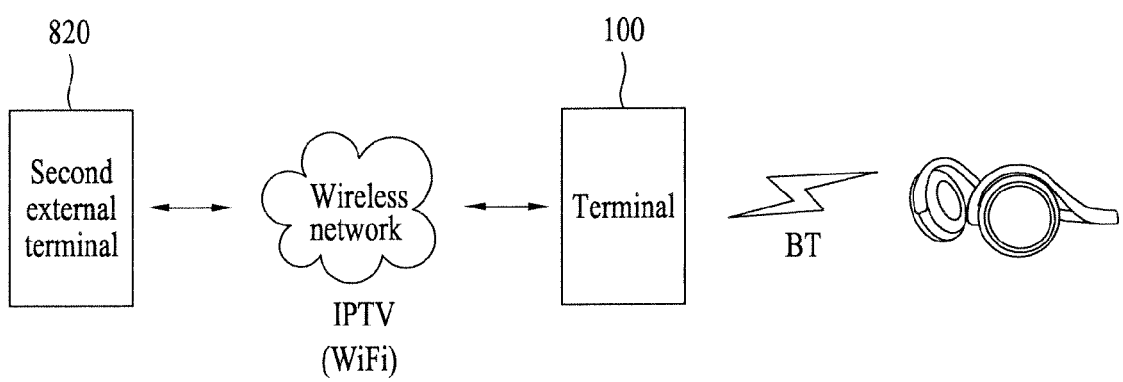

As illustrated in FIG. 8G, an audio signal is output as a result of driving a Bluetooth® module according to a broadcast signal output while using an external Bluetooth® headset with video signal reception and output performed according to an Internet protocol television (IPTV) between the terminal 100 and the second external terminal 820 by driving a WiFi® module. The terminal 100 determines if internal interference is generated [S720].

Furthermore, a second communication module such as a Bluetooth® module in an external terminal may perform a data communication or audio signal output operation while the terminal 100 performs wireless Internet access, a VoIP call connection, a data communication or video streaming by driving a first communication module such as, a WiFi® module (not shown in the drawings). The terminal 100 determines if internal interference is generated [S720].

As illustrated in FIG. 7, if it is determined that interference has been generated [S720], the terminal 100 performs an operation for improving the interference generation [S730]. The controller 180 may directly perform the improving operation or can control another element to perform the improving operation.

Figure 9:
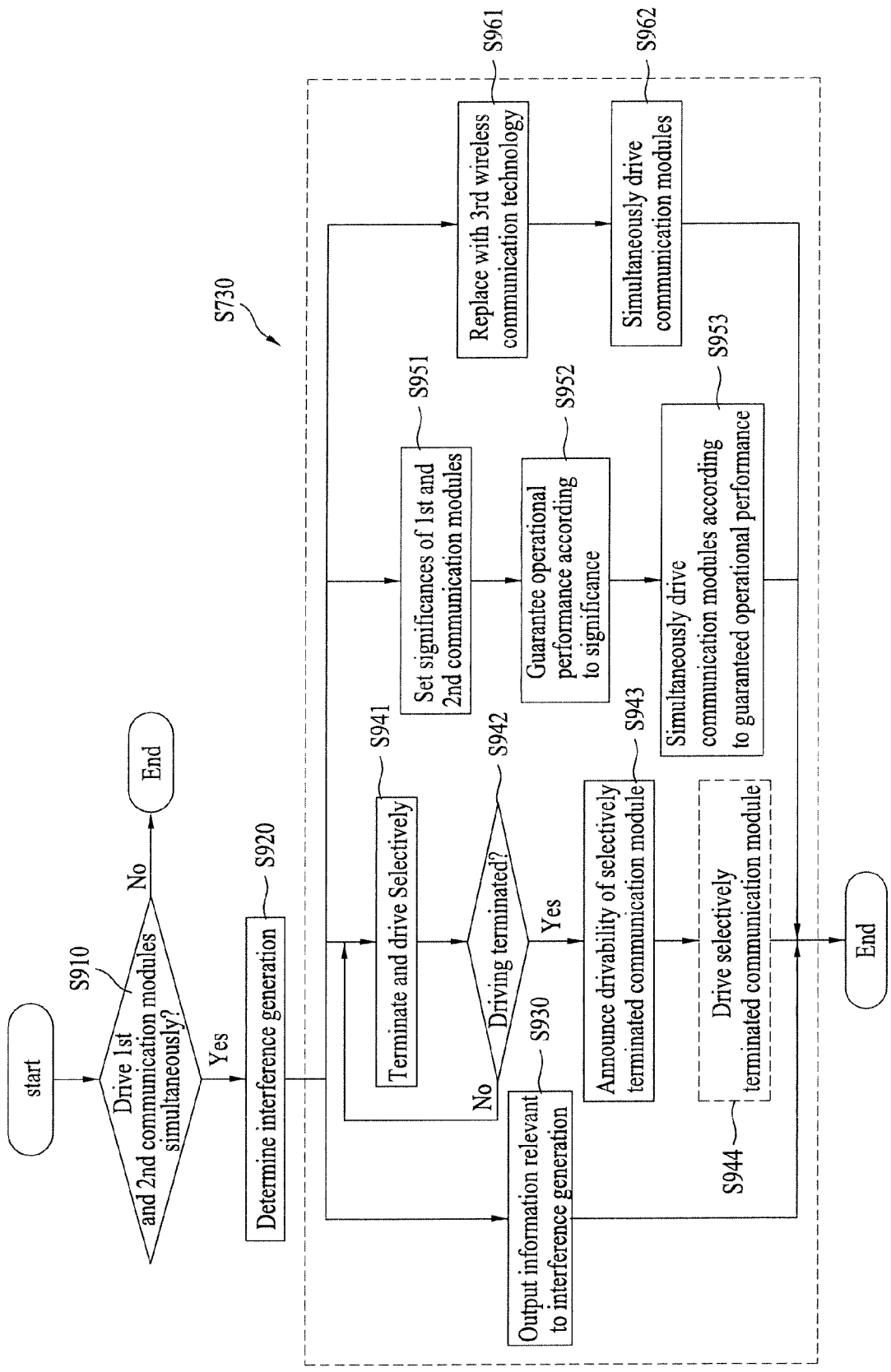
FIG. 9 illustrates a flowchart of a method of improving interference in a terminal according to another embodiment of the present invention when implementing a plurality of wireless communication technologies.

An operation for improving internal interference generation and external interference generation [S730] is explained in detail with reference to FIG. 9 and FIG. 10. FIG. 9 illustrates a flowchart for a method of improving interference in a terminal according to one embodiment of the present invention in which a plurality of wireless communication technologies is implemented.

As illustrated FIG. 9, the terminal 100 determines whether first and second communication modules are simultaneously driven [S910]. For example, the terminal 100 determines simultaneous driving is performed at a predetermined timing point or for a prescribed period of time.

If it is determined that simultaneous driving is performed [S910], the terminal 100 determines that interference is generated by first and second wireless communication technologies [S920]. The terminal 100 then performs an operation for improving an internal interference [S730].

The terminal 100 outputs information relevant to interference generation via the output unit 150 [S930] in a first improving operation. The output of relevant information [S930] is explained with reference to FIGS. 11 to 13.

The terminal 100 displays a window 1110 for representing a phrase, such as 'interference generation detected', 'poor signal performance due to interference generation', 'eliminate interference', or 'check interference' to indicate the interference generation, as illustrated in FIG. 11(a), or displays an icon 1120 to indicate the interference generation, as illustrated in FIG. 11(b), via the display unit 151. Optionally, the terminal 100 may generate vibration, lamp flickering, or an announcement sound using the alarm unit 153 to indicate the interference generation or output an audio signal using the audio output module 152. If 'Check area' is selected in FIG. 11(a) or the interference announcing icon 1120 is selected in FIG. 11(b), the terminal 100 is able to display an interference list, as illustrated in FIG. 12 or FIG. 13.

Figure 12:
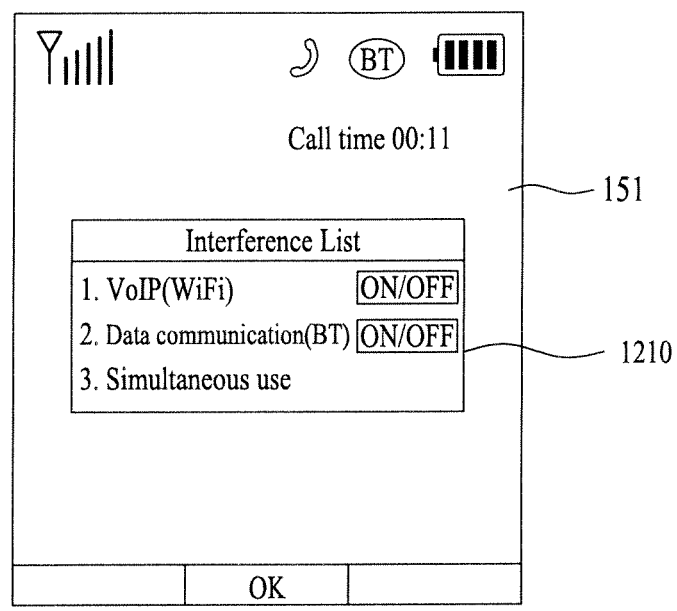

As illustrated in FIG. 12, the terminal 100 displays an interference list 1210 via the display unit 151 to indicate the type of operation of each communication module according to wireless communication technology that generates the interference.

Figure 13:
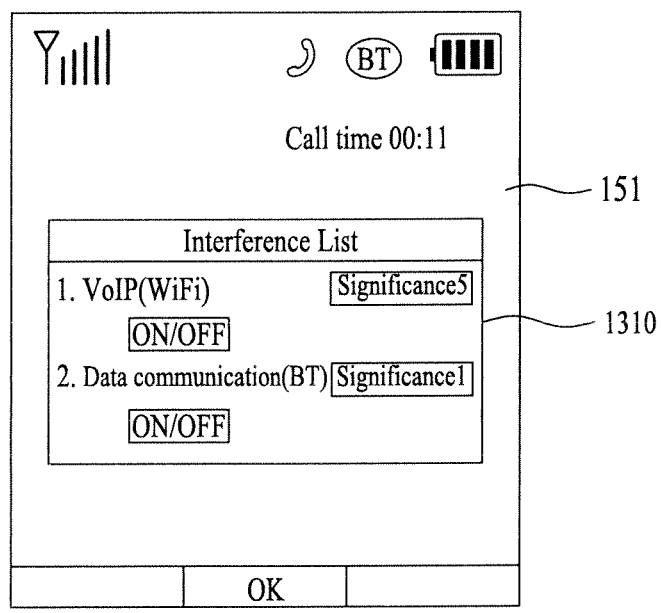

As illustrated in FIG. 13, the terminal 100 displays an interference list 1310 via the display unit 151 on which a significance is indicated according to operation of a communication module by a wireless communication technology that is generating the interference. The indicated significance enables a user to select a maintenance operation for a communication module performing an operation of high significance by informing the user of the corresponding significance.

The significance is a reference set by the user or the terminal 100 according to necessity for securing the operation in consideration of characteristics of the terminal operation. For example, the greater a numeral indicating the significance, the higher the significance is set. Furthermore, as illustrated in FIG. 12 and FIG. 13, the terminal 100 enables a user to select the operation maintenance as ON or OFF via the displayed interference lists 1210 and 1310 according to the communication module, or the simultaneous operation or simultaneous use.

The terminal 100 selectively terminates either the first or second communication module and drives the rest [S941] in a second improving operation. The terminal 100 selects the communication module to terminate according to the significance of the operation performed by the first or second communication module or a presence or non-presence of data transmission/reception for a predetermined period of time for each of the first and second communication modules.

For example, the terminal 100 may select either a communication module performing an operation having a relatively low significance or a significance equal to or less than a predetermined reference. Alternatively, the terminal 100 may select a communication module not performing a data transmitting/receiving operation for a prescribed period of time.

On the other hand, the terminal 100 may determine a communication module to selectively terminate/drive selectively according to a selection made by a user. The user is able to input a selected operation via a keypad, touchpad or touch screen provided in the user input unit 130.

The selective terminating/driving [S941] is explained in detail with reference to FIGS. 14 to 16. For clarity and convenience of description, it is assumed that the first communication module is a Bluetooth® module and the second communication module is a WiFi® module.

As illustrated in FIG. 14(a), the terminal 100 drives (ON) a WiFi® module for performing a VoIP call connection and terminates (OFF) a Bluetooth® module performing an operation of data communication according to selection using an interference list 1410. The terminal 100 stops the data communication operation of the Bluetooth® module and then outputs a phrase 1420 indicating that the data communication operation by the Bluetooth® module is terminated, as illustrated in FIG. 14(b).

Figure 15:
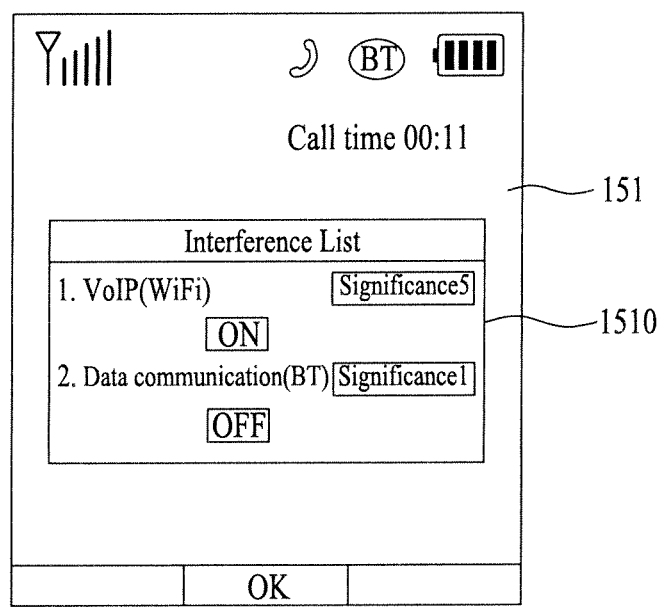

As illustrated in FIG. 15, the terminal 100 displays significance according to operation on an interference list 1510 and then enables a user to select a communication module to terminate/drive according to significance of the operations. The terminal 100 is also able to select a communication module to terminate/drive according to a preset per-operation significance regardless of a user's selection.

As illustrated in FIG. 16(a), the terminal 100 determines a presence or non-presence of data transmission/reception by each of the first and second communication terminals for a predetermined period of time and then enables a user to select whether to terminate the second communication module not performing the data transmission/reception for the prescribed period of time. If the user selects the operation termination ('Yes') 1611, the terminal 100 stops driving the second communication module and outputs a phrase indicating that the second communication module is terminated, as illustrated in FIG. 16(b).

Referring again to FIG. 9, the terminal 100 then determines whether the communication module previously selectively driven [S941] is no longer being driven [S942]. The controller 180 may perform the determination.

The determination [S942] can be executed if a user sets an execution or announcement reservation for the selectively terminated communication module. Alternatively, the determination [S942] can be automatically executed when the selectively driven communication module is terminated.

If it is determined that the selectively driven communication module is no longer driven [S942], the terminal 100 announces that the previously selectively terminated communication module is now drivable [S943]. The terminal 100 may automatically drive the selectively terminated communication module [S944].

The execution reservation/announcement reservation operation for the selectively terminated communication module is explained in detail with reference to FIGS. 17 to 19. For clarity and convenience of description, it is assumed that the selectively terminated communication module is a Bluetooth® module and the selectively driven communication module is a WiFi® module.

Figure 17:
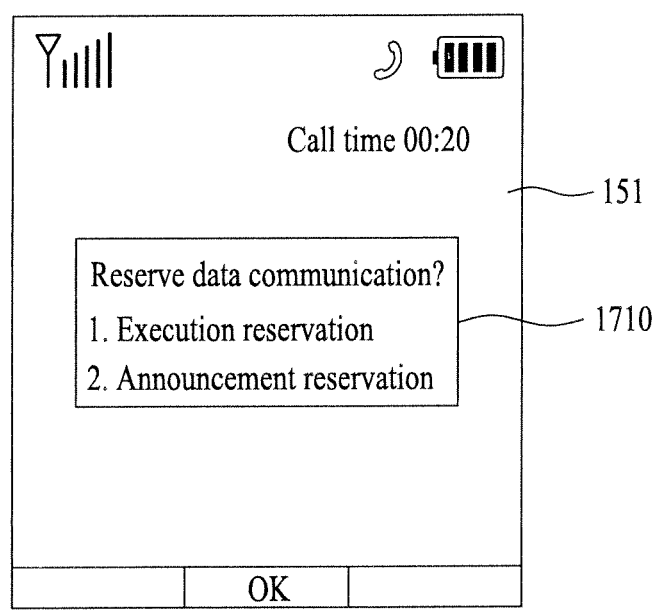

As illustrated in FIG. 17, after a Bluetooth® module is determined as the module to be selectively terminated, a user is able to set up an execution reservation or an announcement reservation for the Bluetooth® module. As illustrated in FIG. 18(a), after the execution reservation has been set in FIG. 17, the terminal 100 outputs a phrase 1810 announcing that an operation by the Bluetooth® module will be executed if termination of the previously driven WiFi® module is detected. A vibration, an audio signal, a lamp flickering, and/or an icon can be used to announce the operation execution by the Bluetooth® module.

Subsequently, the terminal 100 executes the operation by the Bluetooth® module as illustrated in FIG. 18(b). The terminal 100 may also directly execute the operation by the Bluetooth® module without outputting the operation execution announcing phrase 1810.

As illustrated in FIG. 19(a), after the announcement reservation has been set in FIG. 17, the terminal 100 announces the driving availability of the Bluetooth® module and enables a user to select whether to execute the operation by the Bluetooth® module if termination of the previously driven WiFi® module is detected. If operation execution ('Yes') 1911 is selected from in FIG. 19(a), the terminal 100 executes the operation by the Bluetooth® module as illustrated in FIG. 19(b).

The terminal 100 sets significance of operations performed by the first and second communication modules [S951] and guarantees operational performance of each of the communication modules according to the set significance [S952] in a third improving operation. Subsequently, the terminal 100 simultaneously drives both the first and second communication modules [S953] according to the guaranteed operational performance.

Assuming that the first communication module is the Bluetooth® module and second communication modules is the WiFi® module, the terminal 100 sets the significances in decreasing order of a call connection by the WiFi® module, an Internet access by the WiFi® module, a data communication by the Bluetooth® module and a data communication. The significances may be set according to a user's selection or automatically.

If both the call connection by the WiFi® module and the data communication by the Bluetooth® module are simultaneously executed, the terminal 100 is able to guarantee high operational performance of the call connection and relatively low operational performance of the data communication [S942].

When simultaneously driving the communication module [S953], the terminal 100 decreases a speed of the data communication by the Bluetooth® module, drives the Bluetooth® module for a period longer than a setup period, or performs channel hopping on any band except the WiFi® channel band and a predetermined peripheral band.

The simultaneous driving of the first and second communication modules according to the operational performance [S953] is explained in detail with reference to FIG. 20. For clarity and convenience of description, it is assumed that the first communication module is the Bluetooth® module and the second communication module is the WiFi® module.

Figure 20:
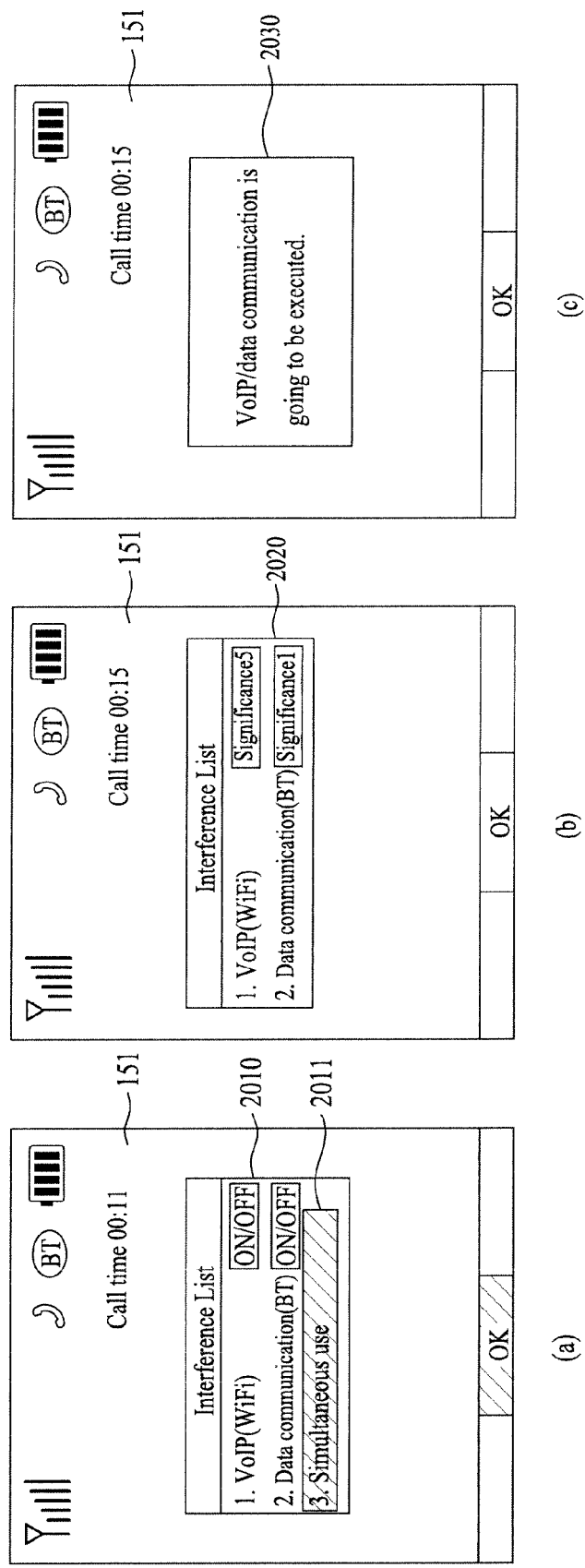

As illustrated in FIG. 20(*a*), if a user selects 'Simultaneous use' 2011 from an interference list 2010, the terminal 100 displays an operation by each communication module and significance 2020 according to the operation as illustrated in FIG. 20(*b*). The user is able to predict operational performance according to the operation of each communication module using the displayed significance of the operations. Subsequently, the terminal 100 drives each communication module according to the operational performance of each communication module and outputs an announcement phrase 2030, as illustrated in FIG. 20(*c*).

If the first and second wireless communication technologies use the same frequency band, the terminal 100 replaces either the first or second wireless communication technologies with a third wireless communication technology that uses a different frequency band [S961] and then simultaneously drives a communication module by the non-replaced wireless communication technology and a third communication module [S962] in a fourth improving operation. Using different frequency bands between wireless communication technologies has less potential to generate interference than using a same frequency band.

For example, if the first and second wireless communication technologies include WiFi® and Bluetooth® each on a 2.4 GHz band, the terminal 100 selects WiBro® on a 2.3 GHz band or WiMAX® on a 2.5 GHz band as the third wireless communication technology to replace WiFi®. WiFi®. It is noted that WiBro® and WiMAX® are examples of WLAN.

The terminal 100 simultaneously drives the second and third communication modules implemented by the second and third wireless communication technologies, respectively, when simultaneously driving the communication modules [S962]. The second communication module and the third communication module can include the short-range wireless communication module 114 implemented by Bluetooth® and the wireless Internet module 113 implemented by WiBro® or WiMAX®, respectively.

The simultaneous driving of the second and third communication modules according to the wireless communication technology replacement [S962] is explained in detail with reference to FIG. 21 and FIG. 22. For clarity and convenience of description, it is assumed that the first wireless communication technology is WiFi®, the second wireless communication technology is Bluetooth® and the third wireless communication technology is WiBro®.

As illustrated in FIG. 21(*a*), the terminal 100 outputs an audio signal according to MP3 playback via an external speaker for Bluetooth® as a result of driving the Bluetooth® module while performing Internet access by WiFi®. Since interference is generated from the simultaneous implementation of WiFi® and Bluetooth®, the terminal 100 displays an interference list 2110 according to a user's selection or automatically, as illustrated in FIG. 21(*b*).

Figure 22:
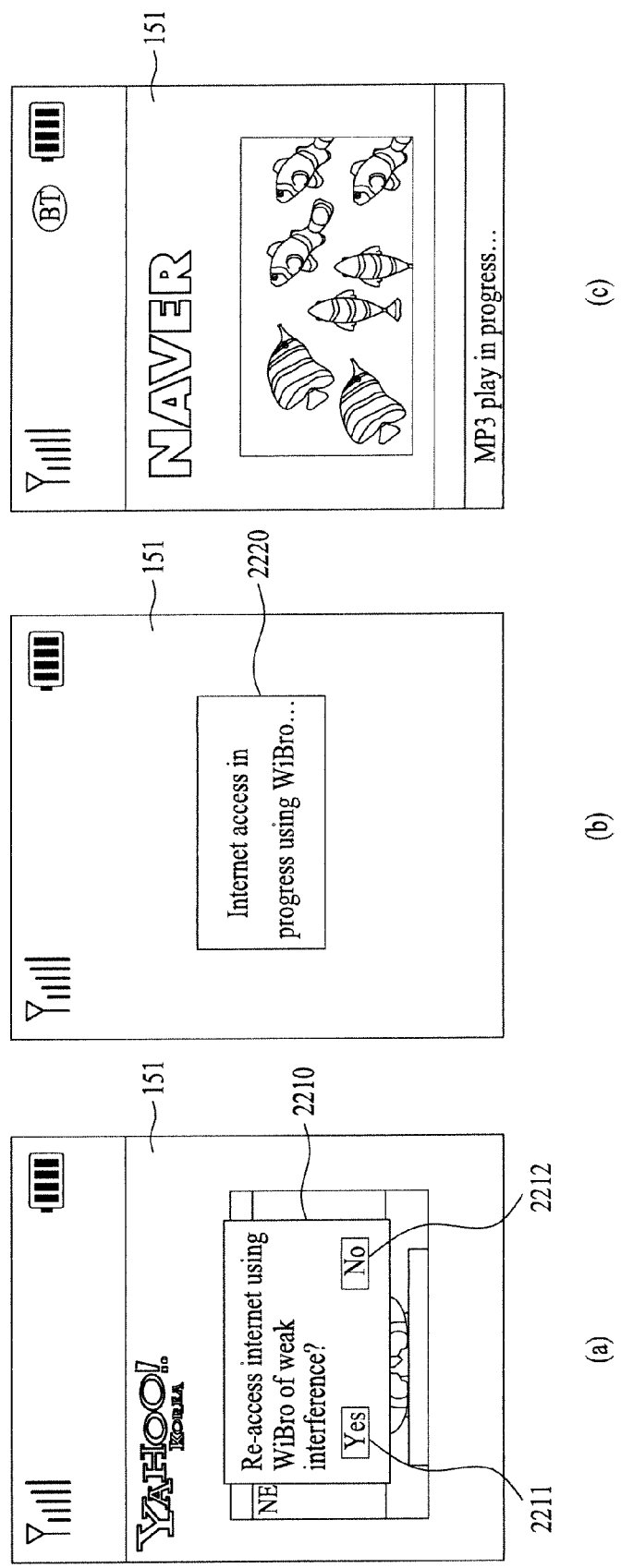
Figure 23:
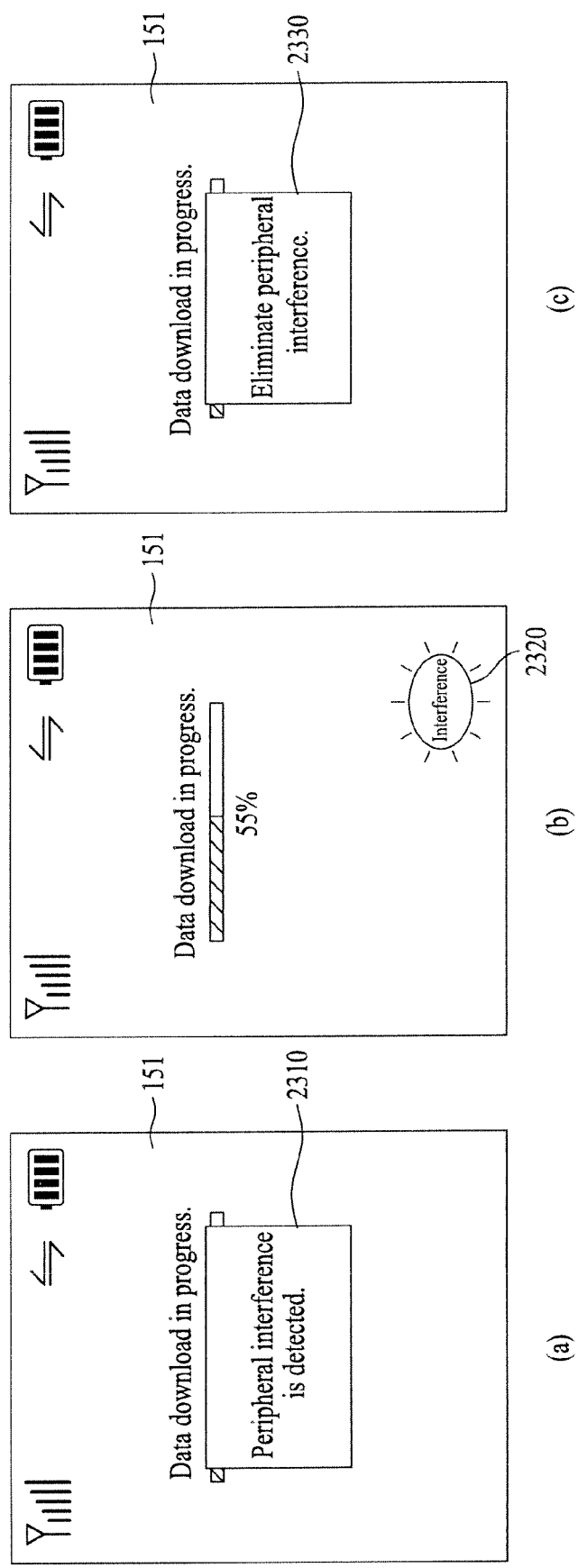
FIGS. 23 to 27 illustrate diagrams of a screen for outputting interference information related to interference generation when external interference is generated in a terminal according to one embodiment of the present invention.

If 'Simultaneous use' is selected from the interference list 2110 in FIG. 21(*b*), the terminal 100 enables a user to select whether to re-access the Internet using WiBro® that uses a different frequency band, as illustrated in FIG. 22(*a*). If the user selects a re-access ('Yes') 2211, the terminal 100 stops the Internet access by WiFi® and then executes an Internet access by WiBro®, as illustrated in FIGS. 22(*b*) and 22(*c*). Optionally, the terminal 100 may execute the Internet access by WiBro® regardless of whether the user selects the re-access.

If 'Simultaneous use' is selected in FIG. 20(*a*) or 21(*b*), the terminal 100 simultaneously drives both the first and second communication modules based on IEEE 802.15.2. IEEE 802.15.2 describes a simultaneous driving mechanism for mitigating interference caused by driving a device or module by WPAN, such as Bluetooth® (hereafter called a Bluetooth® module), when a device or module by WLAN, such as WiFi® (hereinafter called a WiFi module), is being driven. For example, the WiFi® module may correspond to the first communication module and the Bluetooth® module may correspond to the second communication module.

The simultaneous driving mechanism can be classified into a 'collaborative coexistence mechanism' and a 'non-collaborative mechanism'. The 'collaborative coexistence mechanism' is for suppressing mutual interference by exchanging information between WiFi® and Bluetooth® modules. The 'non-collaborative coexistence mechanism' is for suppressing interference of the interfering channel found by the Bluetooth® module searching for the interfering channel without exchanging information between the WiFi® and Bluetooth® modules.

The 'collaborative coexistence mechanism' can include AWMA (alternating wireless medium access) for transmitting information for each transport time only by dividing a beacon time of WiFi® into a Bluetooth® transport time and a WiFi® transport time. Furthermore, the 'collaborative coexistence mechanism' may include PTA (packet traffic arbitration) for avoiding an interfering channel by sharing information on current and future statues. Moreover, the 'collaborative coexistence mechanism' may include DIS (deterministic interference suppression) for substituting a null value for WiFi® module in a frequency of a Bluetooth® signal.

The 'non-collaborative coexistence mechanism' can include AIS (adaptive interference suppression) for eliminating an interference signal by filtering off a signal interfered between WiFi® and Bluetooth® modules via digital filter. Furthermore, the 'non-collaborative coexistence mechanism' may include PSS (packet scheduling and selection) for determining a packet type and a transmission schedule to obtain best performance for an interfering channel band recognized by the Bluetooth® model. Moreover, the 'non-collaborative coexistence mechanism' may include AFH (adaptive frequency-hopping) for excluding interfering channels recognized by the Bluetooth® module itself from a hopping sequence.

Figure 10:
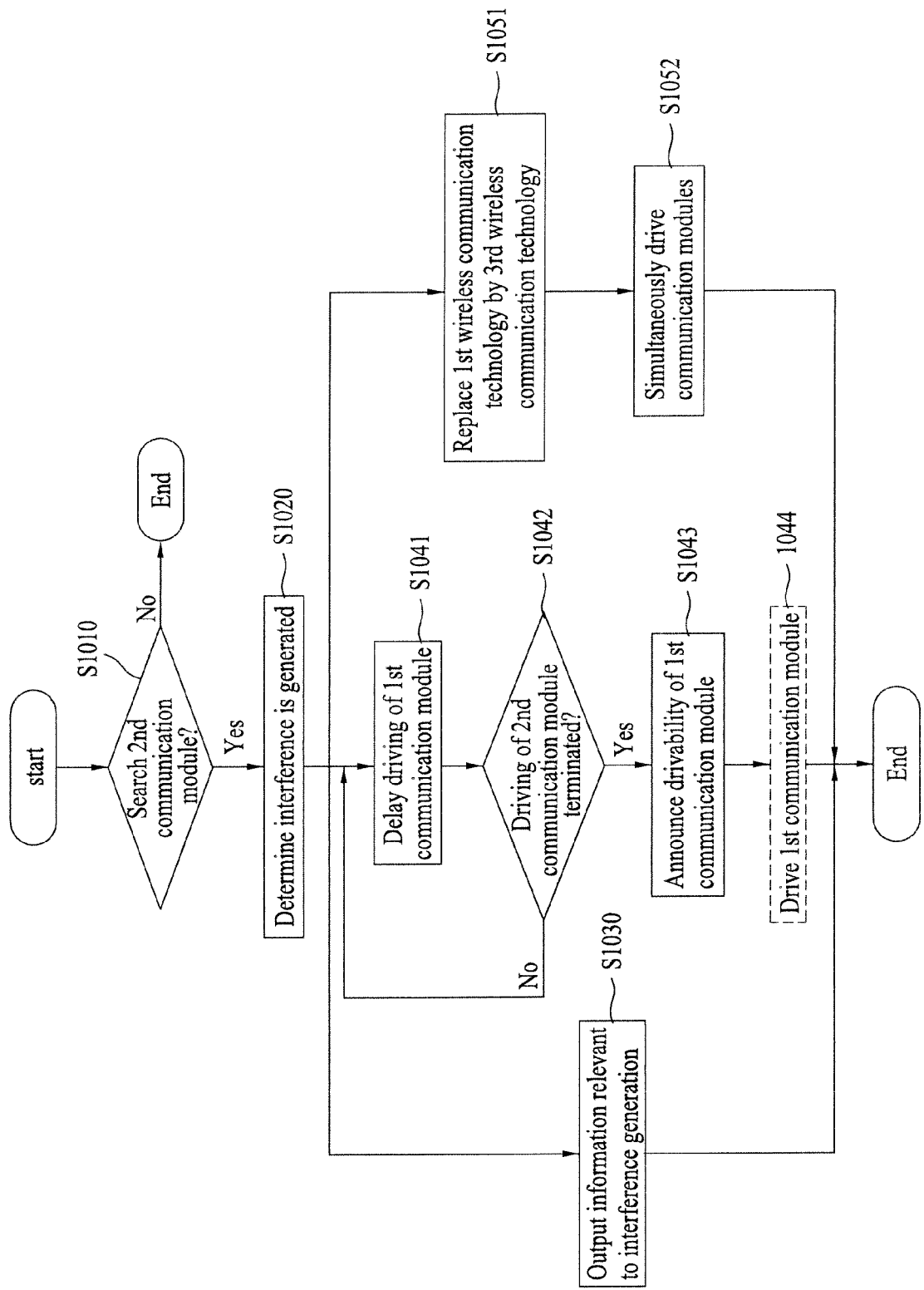
FIG. 10 illustrates a flowchart of a method of improving interference according to another embodiment of the present invention, in which wireless communication technologies are implemented in a terminal and an external communication device.

FIG. 10 illustrates a flowchart for a method of improving interference according to one embodiment of the present invention, in which wireless communication technologies are implemented in a terminal 100 and an external communication device, respectively. As illustrated in FIG. 10, the terminal 100 determines whether to search for a second communication module currently driven in an external terminal while driving a first communication module provided in the terminal [S1010].

For example, if the first communication module is a Bluetooth® module and the second communication module is a WiFi® module, the terminal 100 searches for a Bluetooth® module currently driven in the external terminal by turning on the Bluetooth® module provided in the terminal 100 if signal degradation is detected while driving the WiFi® module. The WiFi® module is an example of the wireless Internet module 113 and the Bluetooth® module is an example of the short-range communication module 114.

If it is determined to search for the second communication module [S1010], the terminal 100 determines that interference is generated by a second wireless communication technology [S1020]. Subsequently, the terminal 100 is able to perform an operation for improving the external interference generation.

In a first improving operation, the terminal 100 outputs information relevant to the interference generation via the output unit 150 [S1030]. The output of relevant information [S1030] is explained in detail with reference to FIGS. 23 to 27. For clarity and convenience of description, it is assumed that the first communication module is a Bluetooth® module and the second communication module is a WiFi® module.

As illustrated in FIG. 23(a), the terminal 100 may display a window 2310 with a phrase to indicate the external interference generation, such as 'Peripheral interference is detected', 'Signal performance is poor due to peripheral interference', or 'check peripheral interference' via the display unit 151. As illustrated in FIG. 23(b), the terminal 100 may display an icon 2320 to indicate the interference generation via the display unit 151. As illustrated in FIG. 23(c), the terminal 100 may display a window 2330 via the display unit 151 to allow elimination of the external interference.

Optionally, the terminal 100 may generate vibration, lamp flickering, or an announcement sound using the alarm unit 153 to indicate the external interference generation or output an audio signal using the audio output module 152. The terminal 100 displays an interference list, as illustrated in FIGS. 24 and 25, if 'Check area' is selected in FIG. 23(a) or 23(c).

Figure 24:
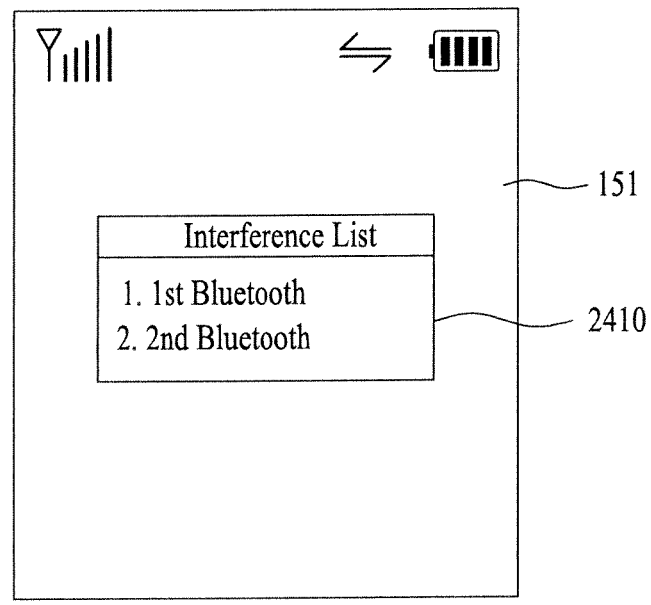

As illustrated in FIG. 24, the terminal 100 outputs identification information related to the external Bluetooth® module via the display unit 151 in order to enable a user to recognize an external Bluetooth® module that generates the external interference. For example, the identification information can include an intrinsic ID (identification) of the Bluetooth® module.

Figure 25:
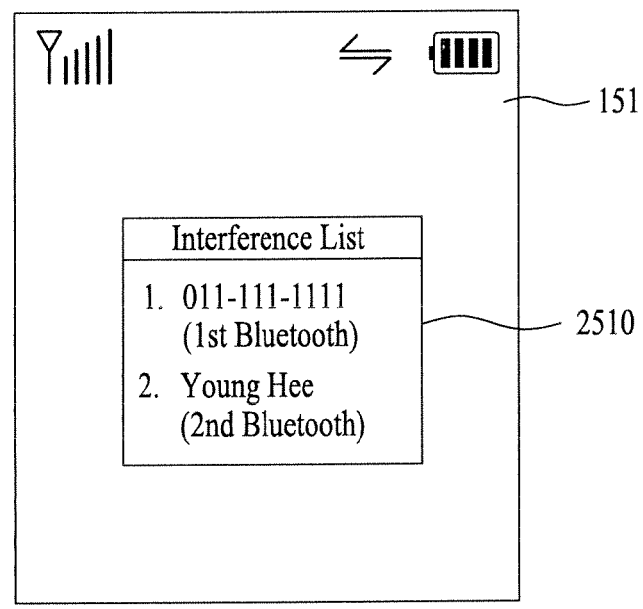

As illustrated in FIG. 25, if information, such as a phone number or setting name, is stored in an external communication device that is provided with the Bluetooth® module that generates the internal interference, such as a mobile phone, the terminal 100 outputs the stored information of the external communication device instead of the identification information on the external Bluetooth® module. The terminal 100 is able to connect a call to the external communication device or send a message to request stopping an operation of the Bluetooth® module via the mobile communication module 112 according to a selection made by a user.

Figure 26:
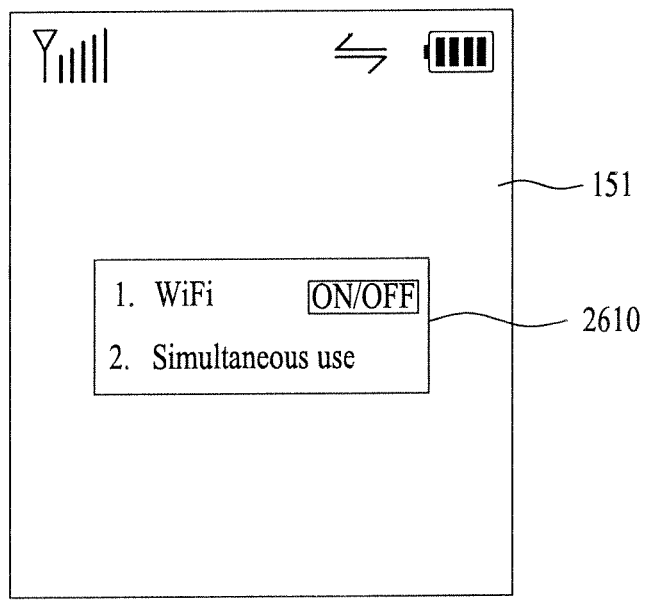

As illustrated in FIG. 26, the terminal 100 displays a window via the display unit 151 to enable a user to turn the WiFi® module ON/OFF or select simultaneous use of both the WiFi® and Bluetooth® modules.

Figure 27:
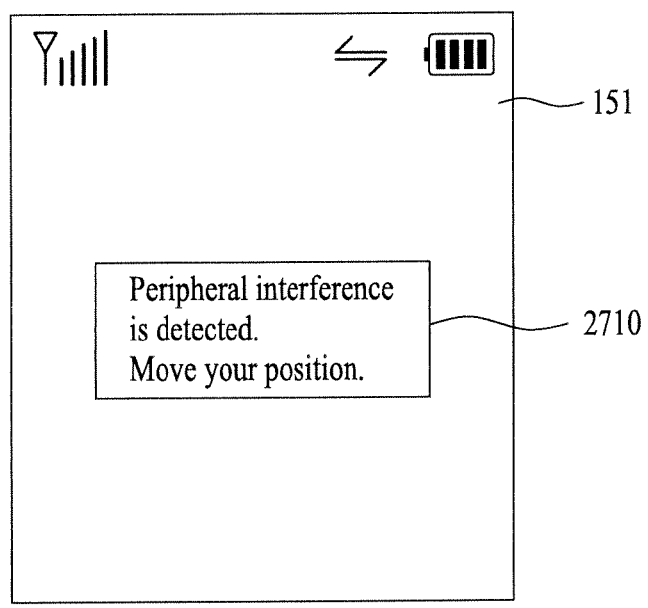

As illustrated in FIG. 27, the terminal 100 displays a phrase via the display unit 151, such as 'Peripheral interference is detected' or 'Move your position', in order to request a position movement to eliminate the external interference. For example, while the terminal 100 and the external terminal are driving the WiFi® module and the Bluetooth® module, the external interference can be eliminated if the terminal 100 moves to a location outside a range of radius 10 m from the external terminal.

In a second improving operation, the terminal 100 delays driving of the first communication module [S1041] and determines whether the second communication module is no longer driven [S1042]. The determination [S1042] can be performed if a user sets an execution or announcement reservation for the first communication module. Alternatively, the determination [S1042] can be automatically executed if the first communication module is terminated. If it is determined that the second communication module is no longer driven [S1042], the terminal 100 indicates that the first communication module is drivable [S1043] or drives the first communication module [S1044].

The execution/announcement reservation operation for the driving-reserved first communication module is explained in detail with reference to FIGS. 28 to 30 as follows. For clarity and convenience of description, it is assumed that the first communication module is a Bluetooth® module and the second communication module is a WiFi® module.

As illustrated in FIG. 28(a), a user is able to set an execution or announcement reservation for the WiFi® module, as illustrated in FIG. 28(b), upon selecting to stop driving or reserve driving (OFF) of the WiFi® module.

As illustrated in FIG. 29(a), after the execution reservation has been set in FIG. 28(b), the terminal 100 outputs a phrase 2910 to indicate that an operation will be executed by the WiFi® module upon detecting the termination of driving the external Bluetooth® module. Vibration, an audio signal, a lamp, and/or an icon may be utilized to indicate the execution of the operation by the WiFi® module.

Subsequently, the terminal 100 executes the operation, such as data download, by the WiFi® module, as illustrated in FIG. 29(b). For example, the WiFi® module may continue to perform the operation interrupted at the timing point of the driving reservation or set a standby mode for executing a new operation. The terminal 100 is also able to directly execute the operation by the WiFi® module without outputting the operation execution announcement phrase 2910.

As illustrated in FIG. 30(a), the terminal 100 enables a user to select whether to execute the operation by the WiFi® module while indicating the driving availability of the WiFi® module if termination of driving the external Bluetooth® module is detected after the announcement reservation has been set in FIG. 28(b). The terminal 100 executes the operation by the WiFi® module, as illustrated in FIG. 30(b), if 'operation execution' (Yes) 3011 is selected in FIG. 30(a).

In a third improving operation, the terminal 100 replaces the first wireless communication technology by a third wireless communication technology that uses a different frequency band [S1051] and then simultaneously drives both the communication modules with the non-replaced wireless communication technology and the third communication module [S1052] if the first and second wireless communication technologies use the same frequency band. Specifically, the first wireless communication technology can be replaced by the third wireless communication technology if the first wireless communication module is WiFi® and the third wireless communication module is WiBro® or WiMAX®.

The descriptions of the replacement [S1051] and simultaneous driving [1052] operations are similar to the corresponding operations [S961] and [S962] illustrated in FIG. 9. However, the process illustrated in FIG. 10 simultaneously drives both the second and third communication modules by replacing the first wireless communication technology by the third wireless communication technology since the terminal 100 is unable to control the operation of the external terminal.

Figure 31:
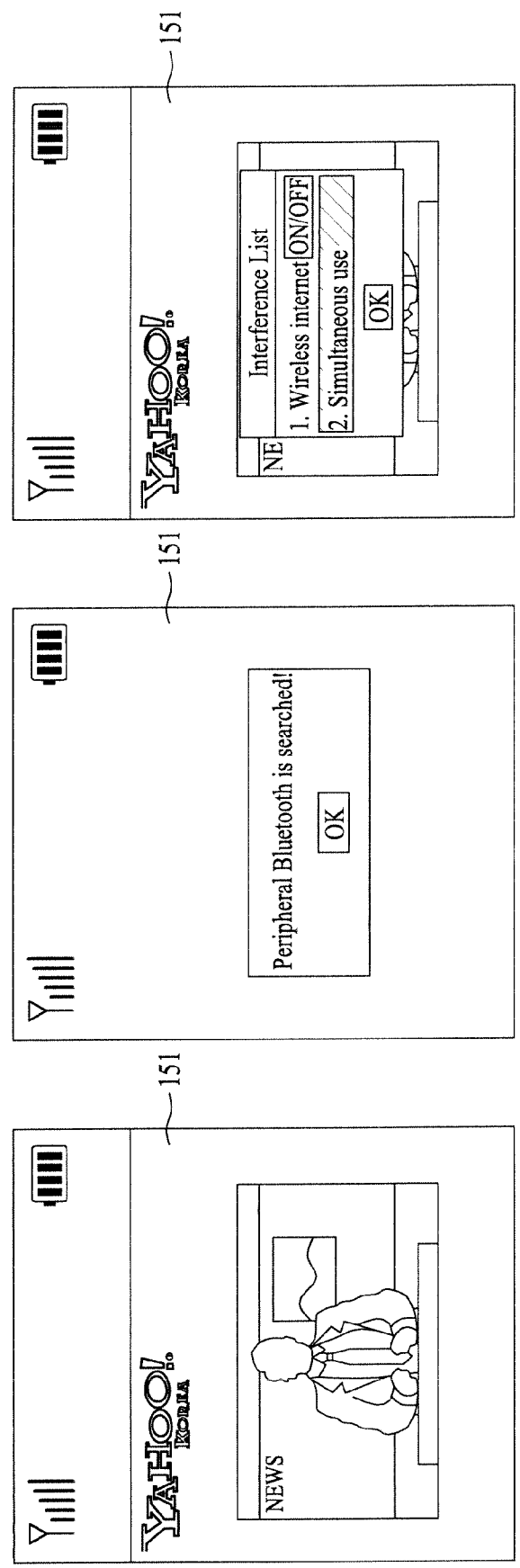
FIG. 31 and FIG. 32 illustrate diagrams of a screen for simultaneously driving a corresponding communication module when external interference is generated in a terminal according to one embodiment of the present invention.
Figure 32:
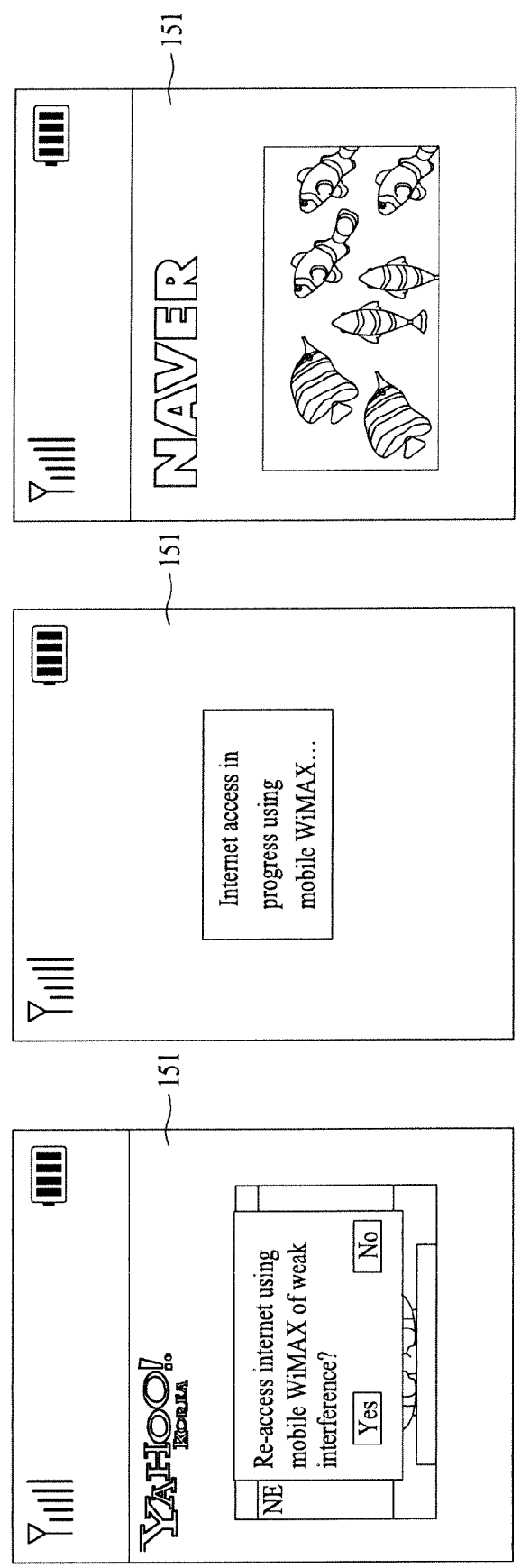

FIG. 31 and FIG. 32 illustrate screens for simultaneously driving a corresponding communication module when external interference is generated in a terminal 100 according to one embodiment of the present invention. Image configurations for the simultaneous driving of the second and third communication modules according to the wireless communication technology replacement are depicted in FIG. 31 and FIG. 32.

The interference improving methods of the present invention can be implemented in a program recorded medium as computer-readable codes. The computer-readable media include all types of recording devices in which data readable by a computer system are stored.

The computer-readable media include ROM, RAM, CD-ROM, magnetic tapes, floppy discs, and optical data storage devices and also include carrier-wave type implementations such as transmission via Internet. The computer can include the controller 180 of the terminal 100.

The present invention provides several effects and/or advantages. First, the present invention effectively improves interference generated from implementing a plurality of wireless communication technologies in a single terminal. Second, the present invention effectively improves interference generated from implementing each wireless communication technology in a plurality of terminals.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A terminal, comprising:
    a display unit displaying information;
    a first communication module implemented by a first wireless communication technology; and
    a controller determining that interference is generated by at least the first wireless communication technology or a second wireless communication technology and performing an operation to improve the generated interference by:
        determining that interference is generated by the first and second wireless communication technologies if the first and second communication modules are provided in the terminal and both the first and second communication terminals are simultaneously driven;

selectively terminating either the first or second communication module and driving the non-terminated communication module; and controlling the display unit to display information relevant to the generated interference, the displayed information comprising at least an announcement indicating that the selectively terminated communication module is available for driving.

2. The terminal of claim 1, wherein each of the first and second wireless comprises at least one of WiFi®, WiBro®, WiMAX®, Bluetooth®, RFID®, or Zigbee®.

3. The terminal of claim 1, wherein the information relevant to the generated interference comprises at least an announcement of the determined interference generation, information relevant to operations of the first and second communication modules or information related to selectively driving the first and second communication modules.

4. The terminal of claim 1, wherein the controller further performs the operation to improve the interference by driving the selectively terminated communication module upon termination of driving the non-terminated communication module.

5. The terminal of claim 1, wherein the controller selects to terminate either the first or second communication module according to significance of an operation performed by each of the first and second communication modules.

6. The terminal of claim 1, wherein the controller selects to terminate either the first or second communication module according to a presence or non-presence of data transmission or reception for a predetermined period of time for each of the first and second communication modules.

7. The terminal of claim 1, wherein the controller guarantees operation performance of each of the first and second communication modules according to significance of an operation performed by each of the first and second communication modules and the controller drives the first and second communication modules according to the corresponding guaranteed operational performance.

8. The terminal of claim 1, wherein the controller determines that interference is generated by the second wireless communication technology upon searching for the second communication module if the second communication module is provided in the different terminal.

9. The terminal of claim 8, further comprising:
an output unit outputting information relevant to the generated interference under control of the controller as part of the improvement operation.

10. The terminal of claim 9, wherein the information relevant to the generated interference comprises at least one of an announcement of the determined interference generation, identification information related to the second communication module, or information related to selectively driving the first and second communication modules.

11. The terminal of claim 8, wherein the controller delays driving the first communication module as part of the improvement operation and either indicates that the first communication module is drivable or drives the first communication module when the driving of the second communication module is terminated.

12. A method of improving interference in a terminal, the method comprising:
driving a first communication module implemented by a first wireless communication technology;
determining that interference is generated by at least one of the first wireless communication technology or a second wireless communication technology; and
performing an operation to improve the generated interference according to a result of the determination by:
determining that interference is generated by the first and second wireless communication technologies if the first and second communication modules are provided in the terminal and both the first and second communication terminals are simultaneously driven;
selectively terminating either the first or second communication module and driving the non-terminated communication module; and
displaying information relevant to the generated interference on a display of the terminal, the displayed information comprising at least an announcement indicating that the selectively terminated communication module is available for driving.

13. The method of claim 12, wherein performing the operation to improve the generated interference further comprises driving the selectively terminated communication module upon termination of the driving of the non-terminated communication module.

14. The method of claim 12, further comprising:
setting significance of an operation performed by each of the first and second communication modules; and
selecting to terminate either the first or second communication module according to the significance.

15. The method of claim 12, further comprising:
determining a presence or non-presence of data transmission or reception for a predetermined period of time for each of the first and second communication modules; and
selecting to terminate either the first or second communication module according to the determination.

16. The method of claim 12, further comprising:
setting significance of an operation performed by each of the first and second communication modules; and
guaranteeing operation performance of each of the first and second communication modules according to the significance,
wherein performing the operation to improve the generated interference further comprises driving the first and second communication modules according to the corresponding guaranteed operational performance.

17. The method of claim 12, wherein the interference is determined as generated by the second wireless communication technology upon searching for the second communication module if the second communication module is provided in the different terminal.

18. The method of claim 17, wherein performing the improvement operation comprises:
delaying the driving of the first communication module; and
indicating that the first communication module is drivable or driving the first communication module when the driving of the second communication module is terminated.

* * * * *